United States Patent
Zhang et al.

(10) Patent No.: US 12,244,826 B2
(45) Date of Patent: Mar. 4, 2025

(54) VIDEO BLOCK PARTITION BASED ON QUINARY-TREE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 197 days.

(21) Appl. No.: 17/398,857

(22) Filed: Aug. 10, 2021

(65) Prior Publication Data
US 2021/0377528 A1   Dec. 2, 2021

Related U.S. Application Data

(63) Continuation of application No. PCT/CN2020/074745, filed on Feb. 11, 2020.

(30) Foreign Application Priority Data

Feb. 11, 2019 (WO) ................ PCT/CN2019/074762
Mar. 6, 2019 (WO) ................ PCT/CN2019/077161

(51) Int. Cl.
H04N 19/70 (2014.01)
H04N 19/119 (2014.01)
(Continued)

(52) U.S. Cl.
CPC ......... H04N 19/176 (2014.11); H04N 19/119 (2014.11); H04N 19/157 (2014.11);
(Continued)

(58) Field of Classification Search
CPC .. H04N 19/176; H04N 19/119; H04N 19/157; H04N 19/174; H04N 19/66;
(Continued)

(56) References Cited

U.S. PATENT DOCUMENTS 3,015,445 A * 1/1962 Kashio ...................... G06F 7/42
                                                                   708/683
RE37,222 E * 6/2001 Yonemitsu ............. H04N 19/50
                                                                   375/240.15
(Continued)

FOREIGN PATENT DOCUMENTS

CN        107079160 A       8/2017
CN        107948661 A       4/2018
(Continued)

OTHER PUBLICATIONS

Lionel Ponton—Two trees enumerating the positive rationals (Year: 2017).*
(Continued)

*Primary Examiner* — Philip P. Dang
(74) *Attorney, Agent, or Firm* — Conley Rose, P.C.

(57) ABSTRACT

Devices, systems and methods for video processing are described. In a representative aspect, there is disclosed a method for video processing, including: determining, according to a splitting information, for a current video block of a video, a partition mode in which the current video block is split into M portions, wherein M>4; and performing a conversion for the current video block based on the partition mode.

16 Claims, 16 Drawing Sheets

(51) Int. Cl.
*H04N 19/157* (2014.01)
*H04N 19/174* (2014.01)
*H04N 19/176* (2014.01)
*H04N 19/66* (2014.01)
*H04N 19/96* (2014.01)

(52) U.S. Cl.
CPC ........... *H04N 19/174* (2014.11); *H04N 19/66* (2014.11); *H04N 19/96* (2014.11)

(58) Field of Classification Search
CPC ...... H04N 19/96; H04N 19/91; H04N 19/186; H04N 19/192; H04N 19/70
See application file for complete search history.

(56) References Cited

U.S. PATENT DOCUMENTS

| | | | | |
|---|---|---|---|---|
| 9,503,702 | B2 * | 11/2016 | Chen | H04N 13/161 |
| 9,667,942 | B2 * | 5/2017 | Chen | H04N 13/161 |
| 9,838,712 | B2 * | 12/2017 | Lin | H04N 19/176 |
| 9,906,813 | B2 * | 2/2018 | Zhang | H04N 13/111 |
| 9,992,494 | B2 * | 6/2018 | Zhang | H04N 19/597 |
| 10,212,411 | B2 | 2/2019 | Zhang et al. | |
| 10,275,020 | B2 * | 4/2019 | Cohen | G06F 3/04815 |
| 10,321,130 | B2 * | 6/2019 | Dong | H04N 19/33 |
| 10,334,281 | B2 | 6/2019 | Zhang et al. | |
| 10,708,589 | B2 * | 7/2020 | Mishurovskiy | H04N 19/176 |
| 10,709,371 | B2 * | 7/2020 | Kalra | A61B 5/486 |
| 10,812,835 | B2 * | 10/2020 | Wang | H04N 19/176 |
| 11,051,023 | B2 * | 6/2021 | Lee | H04N 19/105 |
| 11,115,672 | B2 * | 9/2021 | Zhang | H04N 19/50 |
| 11,184,639 | B2 * | 11/2021 | Lee | H04N 19/105 |
| 11,206,419 | B2 * | 12/2021 | Lee | H04N 19/513 |
| 11,218,704 | B2 * | 1/2022 | Lim | H04N 19/132 |
| 11,228,761 | B2 * | 1/2022 | Zhang | H04N 19/1883 |
| 11,250,326 | B1 * | 2/2022 | Ko | G06N 3/08 |
| 11,350,107 | B2 * | 5/2022 | Jun | H04N 19/593 |
| 11,375,185 | B2 * | 6/2022 | Lee | H04N 19/593 |
| 2009/0116558 | A1 * | 5/2009 | Chen | H04N 19/105 375/E7.125 |
| 2011/0135143 | A1 * | 6/2011 | Zou | H04N 19/70 382/100 |
| 2014/0139627 | A1 * | 5/2014 | Chen | H04N 19/176 348/43 |
| 2015/0237324 | A1 * | 8/2015 | Zhang | H04N 13/15 375/240.24 |
| 2015/0264356 | A1 * | 9/2015 | Zhang | H04N 19/157 375/240.08 |
| 2015/0264399 | A1 * | 9/2015 | Lin | H04N 19/119 375/240.12 |
| 2016/0100190 | A1 * | 4/2016 | Zhang | H04N 13/161 348/43 |
| 2016/0234510 | A1 * | 8/2016 | Lin | H04N 19/119 |
| 2018/0139444 | A1 | 5/2018 | Huang et al. | |
| 2018/0213264 | A1 * | 7/2018 | Zhang | H04N 19/96 |
| 2018/0249146 | A1 * | 8/2018 | Zhang | H04N 13/106 |
| 2018/0352226 | A1 * | 12/2018 | An | H04N 19/12 |
| 2019/0364279 | A1 | 11/2019 | Yasugi et al. | |
| 2020/0359039 | A1 | 11/2020 | Zhao et al. | |
| 2021/0329233 | A1 | 10/2021 | Tsai et al. | |
| 2021/0337198 | A1 * | 10/2021 | Wang | H04N 19/1883 |
| 2021/0368185 | A1 | 11/2021 | Zhang et al. | |
| 2021/0377528 | A1 * | 12/2021 | Zhang | H04N 19/96 |
| 2022/0070448 | A1 | 3/2022 | Kim et al. | |
| 2022/0086439 | A1 | 3/2022 | Tsai et al. | |
| 2022/0217383 | A1 * | 7/2022 | Wang | H04N 19/70 |

FOREIGN PATENT DOCUMENTS

| | | | |
|---|---|---|---|
| CN | 113396589 A | 9/2021 | |
| WO | WO-2013154869 A1 * | 10/2013 | ........... H04N 13/161 |
| WO | 2015007164 A1 | 1/2015 | |
| WO | 2015055134 A1 | 4/2015 | |
| WO | WO-2015135175 A1 * | 9/2015 | ........... H04N 19/119 |
| WO | WO-2015192706 A1 * | 12/2015 | ......... H04N 13/0048 |
| WO | WO-2017088608 A1 * | 6/2017 | ........... H04N 19/107 |
| WO | WO-2014107709 A2 * | 7/2017 | ............. H04N 19/17 |
| WO | WO-2018001207 A1 * | 1/2018 | ........... H04N 19/119 |
| WO | 2018110600 A1 | 6/2018 | |
| WO | 2018141116 A1 | 8/2018 | |
| WO | 2018169267 A1 | 9/2018 | |

OTHER PUBLICATIONS

Bordes et al. "Description of Sdr, Hdr and 360 degree Video Coding Technology Proposal by Qualcomm and Technicolor—Medium Complexity Version," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0022, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Li et al. "Multi-Type-Tree," Joint Video Exploration Tree (JVET) of ITU-T SG 16 WP 3 and ISO/IEC JTC 1/SC 29/WG 11, 4th Meeting, Chengdu, CN, Oct. 15-21, 2016, document JVET-D0117, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Ma et al. "Summary Report for CE1: Partitioning," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0021, 2018.

Sullivan et al. "Overview of the High Efficiency Video Coding (HEVC) Standard," IEEE Transactions on Circuits and Systems for Video Technology, Dec. 2012, 22(12):1649-1668.

JEM-7.0: https://jvet.hhi.fraunhofer.de/svn/svn_HMJEMSoftware/tags/ HM-16.6-JEM-7.0.

https://www.itu.int/rec/T-REC-H.265.

International Search Report and Written Opinion from PCT/CN2020/074745 dated Apr. 30, 2020 (11 pages).

International Search Report and Written Opinion from PCT/CN2020/074746 dated Apr. 24, 2020 (9 pages).

Non-Final Office Action from U.S. Appl. No. 17/398,800 dated Jul. 13, 2023.

Non-Final Office Action from U.S. Appl. No. 17/398,800 dated Feb. 8, 2024.

Ma J., et al., Summary report for CE1: Partitioning, Joint Video Experts Team (JVET) of ITU-T SG 16 WP 3 and ISO/IEC JTC 1/SC 29/WG 11, 12th Meeting: Macao, CN, Oct. 3-12, 2018, JVET-L0021-v3.zip JVET-L0021-v2.docx.

Notice of First Examination Opinion for Chinese Application No. 202080012488.3, mailed Dec. 30, 2024, 28 pages.

* cited by examiner

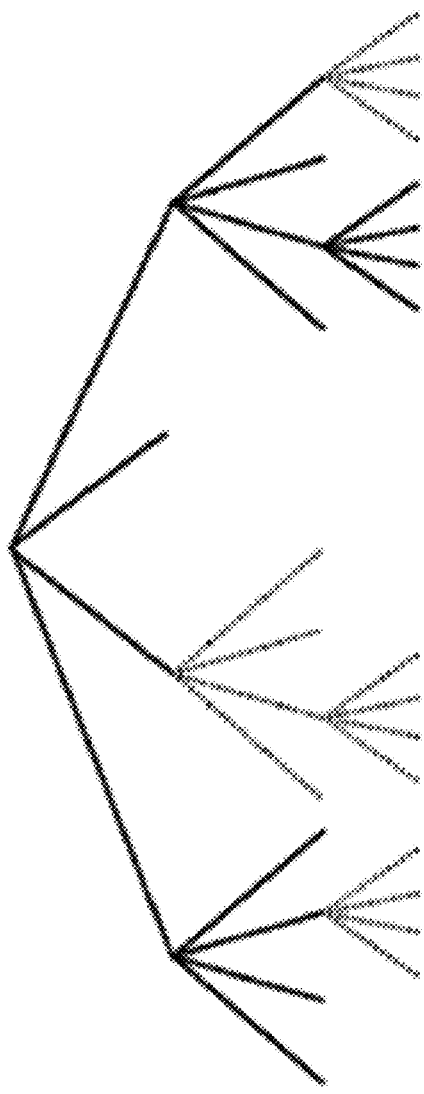
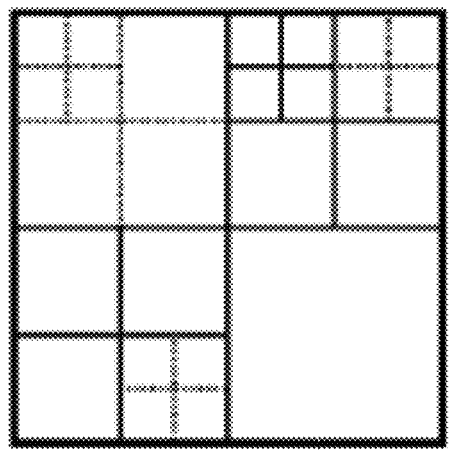
FIG. 3A
FIG. 3B
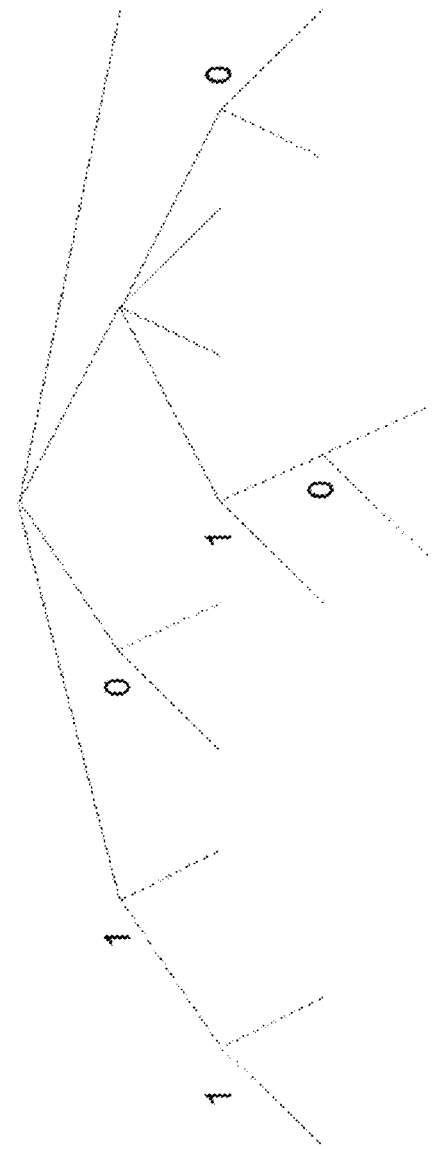
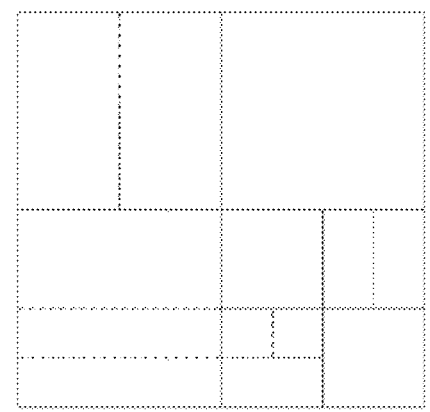
FIG. 4

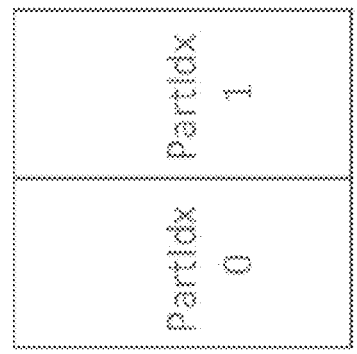
FIG. 5A
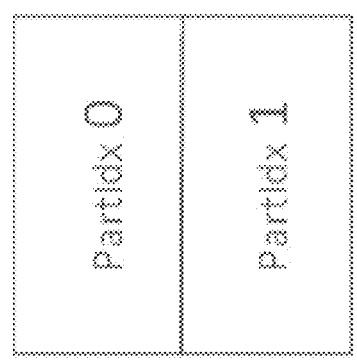
FIG. 5C
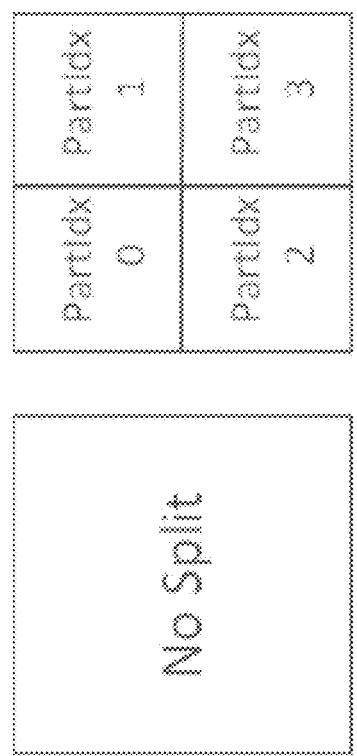
FIG. 5B
FIG. 5D
FIG. 5E
FIG. 5F
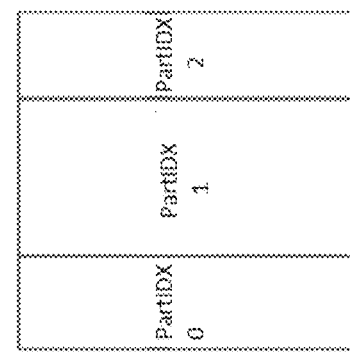
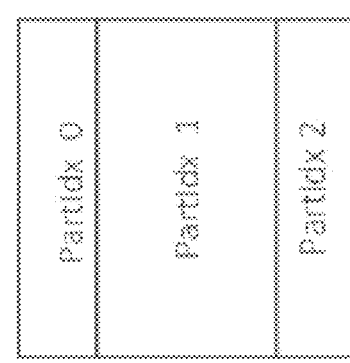

| PartIdx 0 | PartIdx 1 |
|---|---|
| PartIdx 2 | PartIdx 3 |

FIG. 6A

| PartIdx 0 | PartIdx 1 |
|---|---|

FIG. 6B

| PartIdx 0 | PartIdx 1 |
|---|---|

FIG. 6C

| PartIdx 0 |
|---|
| PartIdx 1 |
| PartIdx 2 |

FIG. 6D

| PartIdx 0 |
|---|
| PartIdx 1 |
| PartIdx 2 |

FIG. 6E

VIDEO BLOCK PARTITION BASED ON QUINARY-TREE

CROSS REFERENCE TO RELATED APPLICATIONS

This application is a continuation of International Application No. PCT/CN2020/074745, filed on Feb. 11, 2020 which claims the priority to and benefits of International Patent Applications PCT/CN2019/074762, filed on Feb. 11, 2019 and PCT/CN2019/077161, filed on Mar. 6, 2019. The entire disclosures of the aforementioned applications are incorporated by reference as part of the disclosure of this application.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to quinary tree partitioning in video coding are described. The described methods may be applied to both the existing video coding standards (e.g., High Efficiency Video Coding (HEVC)) and future video coding standards (e.g., Versatile Video Coding (VVC)) or codecs.

In one representative aspect, there is disclosed a method for video processing, comprising: determining, according to a splitting information, for a current video block of a video, a partition mode in which the current video block is split into M portions, wherein M>4; and performing a conversion for the current video block based on the partition mode.

In another representative aspect, there is disclosed a method for video processing, comprising: determining whether splitting a current video block into five child blocks by a quinary-tree (QUI-T) partition is allowed, according to whether the current video block meets a specific condition; and performing a conversion for the current video block based on the determination.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 3A and 3B show examples of partitioning a coding tree block (CTB) and its corresponding quadtree, respectively.

FIG. 4 shows an example of a quadtree plus binary tree (QTBT) structure.

FIGS. 5A-5F show examples of allowed partitions in VVC.

FIGS. 6A-6E show examples of allowed partitions between a parent split (solid) and a current split (dashed), with "X" denoting a disallowed partition.

DETAILED DESCRIPTION

Figure 1:
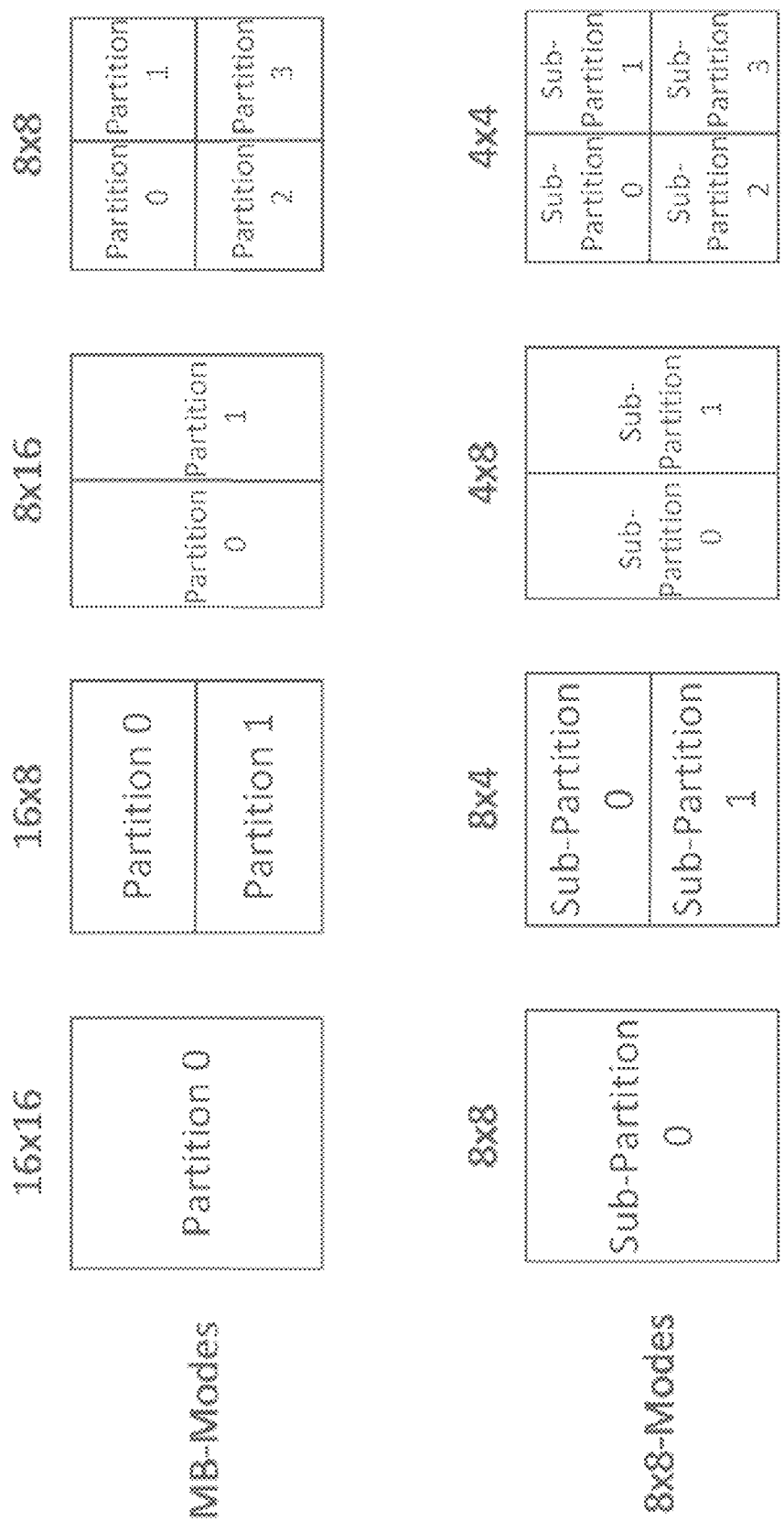
FIG. 1 shows examples of macroblock partitions in H.264/AVC.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Overview of Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/

HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2. Exemplary Embodiments for Quinary Tree Partitioning 2.1 Partition Tree Structure in H.264/AVC The terminology used in H.264/AVS is macroblock and MB-mode/8×8-mode (partition). Macroblock is the unit wherein each picture/slice is split to and where intra/inter mode decision is applied. And partition defines the level wherein motion information is signaled.

The core of the coding layer in H.264/AVC was the macroblock, containing a 16×16 block of luma samples and, in the usual case of 4:2:0 color sampling, two corresponding 8×8 blocks of chroma samples.

2.1.1 H.264/AVC Main Profile

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its macroblock partitions: 16×8, 8×16, 8×8. An syntax element (MB-mode) is signaled to indicate whether 16×16, 16×8, 8×16 or 8×8 is chosen. If 8×8 is selected, another syntax element (8×8-mode) is further signaled to indicate whether 8×8, 8×4, 4×8, 4×4 (see, e.g., FIG. 1) is used. Only one motion vector (MV) per partition is allowed.

2.1.2 H.264/AVC High Profile

In the high profile, 8×8 transform and I_8×8 (8×8 intra prediction) is introduced. For intra-coded macroblock, the transform size is fixed, I_16×6 and I_4×4 uses 4×4 transform; I_8×8 uses 8×8 transform.

For inter-coded macroblocks, either 4×4 or 8×8 transform could be selected. However, the transform size couldn't cross the partition size. For example, if one macroblock chooses 8×8 partition and further selects 8×4 sub-mode, only 4×4 transform may be applied. If one macroblock chooses 16×16, 16×8, 8×168×8 partition with 8×8 sub-mode, then either 4×4 or 8×8 transform could be selected.

2.1.3 Summary

Mode selection is decided in macroblock-level. Transform size shall be no larger than the partition sizes.

2.2 Partition Tree Structure in HEVC

In HEVC, a coding tree unit (CTU, aka largest coding unit, LCU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 2:
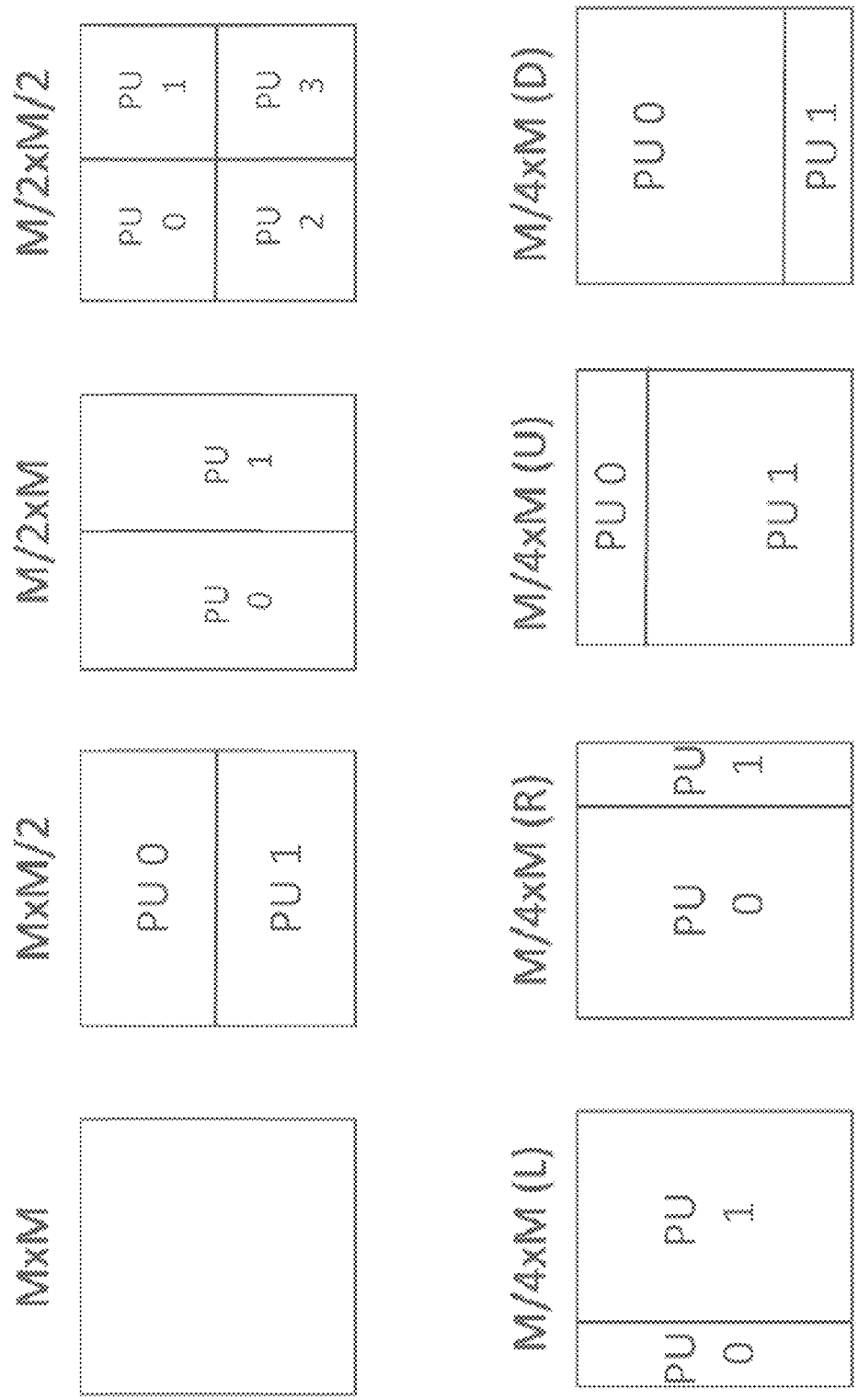
FIG. 2 shows examples of modes for splitting a coding block into prediction blocks.

3) Prediction units (PUs) and prediction blocks (PB s): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 2 depicts the allowed PBs.

4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

2.2.1 Depth of Quadtree

For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intrapicture-predicted CUs, the decoded samples of the nearest-neighboring TBs (within or outside the CB) are used as reference data for intrapicture prediction.

2.2.2 Summary

One CTU may be recursively split into multiple CUs based on increased depth of quadtree (e.g., FIG. 3B). Only square CB and TB partitioning is specified, where a block can be recursively split into quadrants, as illustrated in FIG. 3A.

Mode selection is decided in CU-level. Side information according to a selected mode is signaled in PU-level, such as motion information, intra prediction modes. Residual are signaled in TU-level.

One PU shall be no larger than CU for inter-coded blocks and one PU shall be equal to CU for intra-coded blocks.

TU could cross PU for inter-coded blocks, but shall be equal to PU for intra-coded blocks.

2.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT Block Partitioning Structure

Different from HEVC, the QTBT structure removes the separation of the CU, PU and TU concepts, and supports more flexibility for CU partition shapes. In the QTBT block structure, a CU can have either a square or rectangular shape. In an example, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

- CTU size: the root node size of a quadtree, the same concept as in HEVC
- MinQTSize: the minimum allowed quadtree leaf node size
- MaxBTSize: the maximum allowed binary tree root node size
- MaxBTDepth: the maximum allowed binary tree depth
- MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 4 (left) illustrates an example of block partitioning by using QTBT, and FIG. 4 (right) illustrates the corresponding tree representation. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.3.2 Summary of QTBT

One CTU may be recursively split into multiple CUs based on increased depth of quadtree or binary tree. Square and rectangular CB (with width/height equal to ½ or 2) is specified.

Mode selection is decided in CU-level. PU and TU are always equal to CU.

2.4 Multiple Type Trees (MTT) for VVC

2.4.1 Proposal in JVET-D0117

It is proposed that tree types other than quad-tree and binary-tree are supported. In the implementation, two more ternary tree (TT) partitions, i.e., horizontal and vertical center-side triple-trees are introduced, as shown in FIG. 5E and FIG. 5F.

In some embodiments, the one partition in BT/TT may be further split with BT/TT. Therefore, rectangular blocks are allowed.

There are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.4.2 Partition Tree in VVC

Similarly, it is proposed that three types of partition structures are supported, i.e., QT, BT and TT, as shown in the examples in FIGS. 6A-6E. A block split from QT may be further split by QT/BT/TT, a block split from BT or TT may be further split to BT or TT. However, a block split from BT or TT couldn't be further split to QT anymore.

In VVC, several variables are signaled/derived to control the usage of different partitions. For example:

maximum multi-type tree depth with offset maxMttDepth for luma and chroma, respectively, maximum binary tree size maxBtSize/ternary tree size maxTtSize minimum quadtree size MinQtSize/binary tree size MinBtSize/ternary tree size minTtSize 7.3.2.1 Sequence Parameter Set RBSP Syntax

| | Descriptor |
|---|---|
| seq_parameter_set_rbsp( ) { | |
|   sps_seq_parameter_set_id | ue(v) |
| ... | |
|   qtbtt_dual_tree_intra_flag | ue(v) |
|   log2_ctu_size_minus2 | ue(v) |
|   log2_min_luma_coding_block_size_minus2 | ue(v) |
|   partition_constraints_override_enabled_flag | ue(v) |
|   sps_log2_diff_min_qt_min_cb_intra_tile_group_luma | ue(v) |
|   sps_log2_diff_min_qt_min_cb_inter_tile_group | ue(v) |
|   sps_max_mtt_hierarchy_depth_inter_tile_groups | ue(v) |
|   sps_max_mtt_hierarchy_depth_intra_tile_groups_luma | ue(v) |
|   if( sps_max_mtt_hierarchy_depth_intra_tile_groups_ luma != 0 ) { | |
|     sps_log2_diff_max_bt_min_qt_intra_tile_group_luma | ue(v) |
|     sps_log2_diff_max_tt_min_qt_intra_tile_group_luma | ue(v) |
|   } | |
|   if( sps_max_mtt_hierarchy_depth_inter_tile_groups != 0 ) { | |
|     sps_log2_diff_max_bt_min_qt_inter_tile_group | ue(v) |
|     sps_log2_diff_max_tt_min_qt_inter_tile_group | ue(v) |
|   } | |
|   if( qtbtt_dual_tree_intra_flag ) { | |
|     sps_log2_diff_min_qt_min_cb_intra_tile_group_chroma | ue(v) |
|     sps_max_mtt_hierarchy_depth_intra_tile_groups_chroma | ue(v) |
|     if ( sps_max_mtt_hierarchy_depth_intra_tile_groups_ chroma != 0 ) { | |
|       sps_log2_diff_max_bt_min_qt_intra_tile_group_chroma | ue(v) |
|       sps_log2_diff_max_tt_min_qt_intra_tile_group_chroma | ue(v) |
|     } | |
|   } | |
|   sps_sao_enabled_flag | u(1) |
| ... | |
|   rbsp_trailing_bits( ) | |
| } | |

Semantics sps_max_mtt_hierarchy_depth_inter_tile_groups specifies the default maximum hierarchy depth for coding units resulting from multi-type tree splitting of a quadtree leaf in tile groups with tile_group_type equal to 0 (B) or 1 (P) referring to the SPS. When partition_constraints_override_flag is equal to 1, the default maximum hierarchy depth can be overridden by tile_group_max_mtt_hierarchy_depth_luma present in the tile group header of the tile groups referring to the SPS. The value of sps_max_mtt_hierarchy_depth_inter_tile_groups shall be in the range of 0 to CtbLog2SizeY-MinCbLog2SizeY, inclusive.

sps_max_mtt_hierarchy_depth_intra_tile_groups_luma specifies the default maximum hierarchy depth for coding units resulting from multi-type tree splitting of a quadtree leaf in tile groups with tile_group_type equal to 2 (I) referring to the SPS. When partition_constraints_override_flag is equal to 1, the default maximum hierarchy depth can be overridden by tile_group_max_mtt_hierarchy_depth_luma present in the tile group header of the tile groups referring to the SPS. The value of sps_max_mtt_hierarchy_depth_intra_tile_groups_luma shall be in the range of 0 to CtbLog2SizeY-MinCbLog2SizeY, inclusive.

sps_log2_diff_max_bt_min_qt_intra_tile_group_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in tile groups with tile_group_type equal to 2 (I) referring to the SPS. When partition_constraints_override_flag is equal to 1, the default difference can be overridden by tile_group_log2_diff_max_bt_min_qt_luma present in the tile group header of the tile groups referring to the SPS. The value of sps_log2_diff_max_bt_min_qt_intra_tile_group_luma shall be in the range of 0 to CtbLog2SizeY-MinQtLog2SizeIntraY, inclusive. When sps_log2_diff_max_bt_min_qt_intra_tile_group_luma is not present, the value of sps_log2_diff_max_bt_min_qt_intra_tile_group_luma is inferred to be equal to 0.

sps_log2_diff_max_tt_min_qt_infra_tile_group_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in tile groups with tile_group_type equal to 2 (I) referring to the SPS. When partition_constraints_override_flag is equal to 1, the default difference can be overridden by tile_group_log2_diff_max_tt_min_qt_luma present in the tile group header of the tile groups referring to the SPS. The value of sps_log2_diff_max_tt_min_qt_intra_tile_group_luma shall be in the range of 0 to CtbLog2SizeY-MinQtLog2SizeIntraY, inclusive. When sps_log2_diff_max_tt_min_qt_intra_tile_group_luma is not present, the value of sps_log2_diff_max_tt_min_qt_intra_tile_group_luma is inferred to be equal to 0.

sps_log2_diff_max_bt_min_qt_inter_tile_group specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in tile groups with tile_group_type equal to 0 (B) or 1 (P) referring to the SPS. When partition_constraints_override_flag is equal to 1, the default difference can be overridden by tile_group_log2_diff_max_bt_min_qt_luma present in the tile group header of the tile groups referring to the SPS. The value of sps_log2_diff_max_bt_min_qt_inter_tile_group shall be in the range of 0 to CtbLog2SizeY-MinQtLog2SizeInterY, inclusive. When sps_log2_diff_max_bt_min_qt_inter_tile_group is not present, the value of sps_log2_diff_max_bt_min_qt_inter_tile_group is inferred to be equal to 0.

sps_log2_diff_max_tt_min_qt_inter_tile_group specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in tile groups with tile_group_type equal to 0 (B) or 1 (P) referring to the SPS. When partition_constraints_override_flag is equal to 1, the default difference can be overridden by tile_group_log2_diff_max_tt_min_qt_luma present in the tile group header of the tile groups referring to the SPS. The value of sps_log2_diff_max_tt_min_qt_inter_tile_group shall be in the range of 0 to CtbLog2SizeY-MinQtLog2SizeInterY, inclusive. When sps_log2_diff_max_tt_min_qt_inter_tile_group is not present, the value of sps_log2_diff_max_tt_min_qt_inter_tile_group is inferred to be equal to 0.

sps_log2_diff_min_qt_min_cb_intra_tile_group_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in tile groups with tile_group_type equal to 2 (I) referring to the SPS. When partition_constraints_override_flag is equal to 1, the default difference can be overridden by tile_group_log2_diff_min_qt_min_cb_chroma present in the tile group header of the tile groups referring to the SPS. The value of sps_log2_diff_min_qt_min_cb_intra_tile_group_chroma shall be in the range of 0 to CtbLog2SizeY-MinCbLog2SizeY, inclusive. When not present, the value of sps_log2_diff_min_qt_min_cb_intra_tile_group_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$MinQtLog2SizeIntraC=sps\_log2\_diff\_min\_qt\_min\_cb\_intra\_tile\_group\_chroma+MinCbLog2SizeY \quad (728)$$

sps_max_mtt_hierarchy_depth_intra_tile_groups_chroma specifies the default maximum hierarchy depth for chroma coding units resulting from multi-type tree splitting of a chroma quadtree leaf with treeType equal to DUAL_TREE_CHROMA in tile groups with tile_group_type equal to 2 (I) referring to the SPS. When partition_constraints_override_flag is equal to 1, the default maximum hierarchy depth can be overridden by tile_group_max_mtt_hierarchy_depth_chroma present in the tile group header of the tile groups referring to the SPS. The value of sps_max_mtt_hierarchy_depth_intra_tile_groups_chroma shall be in the range of 0 to CtbLog2SizeY-MinCbLog2SizeY, inclusive. When not present, the value of sps_max_mtt_hierarchy_depth_intra_tile_groups_chroma is inferred to be equal to 0.

sps_log2_diff_max_bt_min_qt_intra_tile_group_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in tile groups with tile_group_type equal to 2 (I) referring to the SPS. When partition_constraints_override_flag is equal to 1, the default difference can be overridden by tile_group_log2_diff_max_bt_min_qt_chroma present in the tile group header of the tile groups referring to the SPS. The value of sps_log2_diff_max_bt_min_qt_intra_tile_group_chroma shall be in the range of 0 to CtbLog2SizeY-MinQtLog2SizeIntraC, inclusive. When sps_log2_diff_max_bt_min_qt_intra_tile_group_chroma is not present, the value of sps_log2_diff_max_bt_min_qt_intra_tile_group_chroma is inferred to be equal to 0.

sps_log2_diff_max_tt_min_qt_infra_tile_group_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in tile groups with tile_group_type equal to 2 (I) referring to the SPS. When partition_constraints_override_flag is equal to 1, the default difference can be overridden by tile_group_log2_diff_max_tt_min_qt_chroma present in the tile group header of the tile groups referring to the SPS. The value of sps_log2_diff_max_tt_min_qt_intra_tile_group_chroma shall be in the range of 0 to CtbLog2SizeY-MinQtLog2SizeIntraC, inclusive. When sps_log2_diff_max_tt_min_qt_intra_tile_group_chroma is not present, the value of sps_log2_diff_max_tt_min_qt_intra_tile_group_chroma is inferred to be equal to 0.

2.4.2.1 Restrictions of Usage of BT and TT 2.4.2.1.1 Variable Definitions tile_group_log2_diff_min_qt_min_cb_luma specifies the difference between the base 2 logarithm of the minimum size in luma samples of a luma leaf block resulting from quadtree splitting of a CTU and the base 2 logarithm of the minimum coding block size in luma samples for luma CUs in the current tile group. The value of tile_group_log2_diff_min_qt_min_cb_luma shall be in the range of 0 to CtbLog2SizeY—MinCbLog2SizeY, inclusive. When not present, the value of tile_group_log2_diff_min_qt_min_cb_luma is inferred as follows:
- If tile_group_type equal to 2 (I), the value of tile_group_log2_diff_min_qt_min_cb_luma is inferred to be equal to sps_log2_diff_min_qt_min_cb_intra_tile_group_luma
- Otherwise (tile_group_type equal to 0 (B) or 1 (P)), the value of tile_group_log2_diff_min_qt_min_cb_luma is inferred to be equal to sps_log2_diff_min_qt_min_cb_inter_tile_group.

tile_group_max_mtt_hierarchy_depth_luma specifies the maximum hierarchy depth for coding units resulting from multi-type tree splitting of a quadtree leaf in the current tile group. The value of tile_group_max_mtt_hierarchy_depth_luma shall be in the range of 0 to CtbLog2SizeY-MinCbLog2SizeY, inclusive. When not present, the value of tile_group_max_mtt_hierarchy_depth_luma is inferred as follows:
- If tile_group_type equal to 2 (I), the value of tile_group_max_mtt_hierarchy_depth_luma is inferred to be equal to sps_max_mtt_hierarchy_depth_intra_tile_groups_luma
- Otherwise (tile_group_type equal to 0 (B) or 1 (P)), the value of tile_group_max_mtt_hierarchy_depth_luma is inferred to be equal to sps_max_mtt_hierarchy_depth_inter_tile_groups.

tile_group_log2_diff_max_bt_min_qt_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the current tile group. The value of tile_group_log2_diff_max_bt_min_qt_luma shall be in the range of 0 to CtbLog2SizeY—MinQtLog2SizeY, inclusive. When not present, the value of tile_group_log2_diff_max_bt_min_qt_luma is inferred as follows:
- If tile_group_type equal to 2 (I), the value of tile_group_log2_diff_max_bt_min_qt_luma is inferred to be equal to sps_log2_diff_max_bt_min_qt_intra_tile_group_luma
- Otherwise (tile_group_type equal to 0 (B) or 1 (P)), the value of tile_group_log2_diff_max_bt_min_qt_luma is inferred to be equal to sps_log2_diff_max_bt_min_qt_inter_tile_group.

tile_group_log2_diff_max_tt_min_qt_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in in the current tile group. The value of tile_group_log2_diff_max_tt_min_qt_luma shall be in the range of 0 to CtbLog2SizeY—MinQtLog2SizeY, inclusive. When not present, the value of tile_group_log2_diff_max_tt_min_qt_luma is inferred as follows:

If tile_group_type equal to 2 (I), the value of tile_group_log2_diff_max_tt_min_qt_luma is inferred to be equal to sps_log2_diff_max_tt_min_qt_intra_tile_group_luma Otherwise (tile_group_type equal to 0 (B) or 1 (P)), the value of tile_group_log2_diff_max_tt_min_qt_luma is inferred to be equal to sps_log2_diff_max_tt_min_qt_inter_tile_group.

tile_group_log2_diff_min_qt_min_cb_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in the current tile group. The value of tile_group_log2_diff_min_qt_min_cb_chroma shall be in the range of 0 to CtbLog2SizeY—MinCbLog2SizeY, inclusive. When not present, the value of tile_group_log2_diff_min_qt_min_cb_chroma is inferred to be equal to sps_log2_diff_min_qt_min_cb_intra_tile_group_chroma.

tile_group_max_mtt_hierarchy_depth_chroma specifies the maximum hierarchy depth for coding units resulting from multi-type tree splitting of a quadtree leaf with treeType equal to DUAL_TREE_CHROMA in the current tile group. The value of tile_group_max_mtt_hierarchy_depth_chroma shall be in the range of 0 to CtbLog2SizeY—MinCbLog2SizeY, inclusive. When not present, the values of tile_group_max_mtt_hierarchy_depth_chroma is inferred to be equal to sps_max_mtt_hierarchy_depth_intra_tile_groups_chroma.

tile_group_log2_diff_max_bt_min_qt_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in the current tile group. The value of tile_group_log2_diff_max_bt_min_qt_chroma shall be in the range of 0 to CtbLog2SizeY—MinQtLog2SizeC, inclusive. When not present, the value of tile_group_log2_diff_max_bt_min_qt_chroma is inferred to be equal to sps_log2_diff_max_bt_min_qt_intra_tile_group_chroma tile_group_log2_diff_max_tt_min_qt_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in the current tile group. The value of tile_group_log2_diff_max_tt_min_qt_chroma shall be in the range of 0 to CtbLog2SizeY—MinQtLog2SizeC, inclusive. When not present, the value of tile_group_log2_diff_max_tt_min_qt_chroma is inferred to be equal to sps_log2_diff_max_tt_min_qt_intra_tile_group_chroma The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

MinQtLog2SizeY=MinCbLog2SizeY+
    tile_group_log2_diff_min_qt_min_cb_luma     (7-33)

MinQtLog2SizeC=MinCbLog2SizeY+
    tile_group_log2_diff_min_qt_min_cb_chroma     (7-34)

MinQtSizeY=1<<MinQtLog2SizeY     (7-35)

MinQtSizeC=1<<MinQtLog2SizeC     (7-36)

MaxBtSizeY=1<<(MinQtLog2SizeY+
    tile_group_log2_diff_max_bt_min_qt_luma)     (7-37)

MaxBtSizeC=1<<(MinQtLog2SizeC+
    tile_group_log2_diff_max_bt_min_qt_chroma)     (7-38)

MinBtSizeY=1<<MinCbLog2SizeY     (7-39)

MaxTtSizeY=1<<(MinQtLog2SizeY+
    tile_group_log2_diff_max_tt_min_qt_luma)     (7-40)

MaxTtSizeC=1<<(MinQtLog2SizeC+
    tile_group_log2_diff_max_tt_min_qt_chroma)     (7-41)

MinTtSizeY=1<<MinCbLog2SizeY     (7-42)

MaxMttDepthY=tile_group_max_mtt_hierarchy_depth_luma   (7-43)

MaxMttDepthC=tile_group_max_mtt_hierarchy_depth_chroma
    (7-44)

log2_ctu_size_minus2, log2_min_luma_coding_block_size_minus2 are signaled in SPS.

log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

CtbLog2SizeY=log2_ctu_size_minus2+2     (7-7)

CtbSizeY=1<<CtbLog2SizeY     (7-8)

MinCbLog2SizeY=log2_min_luma_coding_block_size_minus2+2
    (7-9)

MinCbSizeY=1<<MinCbLog2SizeY     (7-10)

MinTbLog2SizeY=2     (7-11)

MaxTbLog2SizeY=6     (7-12)

MinTbSizeY=1<<MinTbLog2SizeY     (7-13)

MaxTbSizeY=1<<MaxTbLog2SizeY     (7-14)

PicWidthInCtbsY=Ceil
(pic_width_in_luma_samples÷CtbSizeY)  (7-15)

PicHeightInCtbsY=Ceil
(pic_height_in_luma_samples÷CtbSizeY)  (7-16)

PicSizeInCtbsY=PicWidthInCtbsY*PicHeightInCtbsY  (7-17)

PicWidthInMinCbsY=pic_width_in_luma_samples/
MinCbSizeY  (7-18)

PicHeightInMinCbsY=pic_height_in_luma_samples/
MinCbSizeY  (7-19)

PicSizeInMinCbsY=PicWidthInMinCbsY*PicHeightInMinCbsY
(7-20)

PicSizeInSamplesY=pic_width_in_luma_samples*pic_height_in_luma_samples (7-21)

PicWidthInSamplesC=pic_width_in_luma_samples/
SubWidthC  (7-22)

PicHeightInSamplesC=pic_height_in_luma_samples/
SubHeightC  (7-23)

[Ed. (BB): Currently the maximum transform size (64×64 luma samples and corresponding chroma sample size) and the minimum transform size (4×4 luma samples and corresponding chroma samples) is fixed, pending further specification development.]

2.4.2.1.2 Allowed Binary Split Process
Inputs to this process are:
a binary split mode btSplit,
a coding block width cbWidth,
a coding block height cbHeight,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a partition index partIdx.
Output of this process is the variable allowBtSplit.

TABLE 1

Specification of parallelTtSplit and cbSize based on btSplit

| | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variables parallelTtSplit and cbSize are derived as specified in Table 1.
The variable allowBtSplit is derived as follows:
If one or more of the following conditions are true, allowBtSplit is set equal to FALSE:
//according to block size and maximum allowed MTT depth
  cbSize is less than or equal to MinBtSizeY
  cbWidth is greater than maxBtSize
  cbHeight is greater than maxBtSize
  mttDepth is greater than or equal to maxMttDepth
Otherwise, if all of the following conditions are true, allowBtSplit is set equal to FALSE
//according to picture boundary (no vertical BT for bottom picture boundary and bottom-right picture boundary)
  btSplit is equal to SPLIT BT VER
  y0+cbHeight is greater than pic height in luma samples
Otherwise, if all of the following conditions are true, allowBtSplit is set equal to FALSE
//according to picture boundary (no horizontal BT for right picture boundary)
  btSplit is equal to SPLIT_BT_HOR
  x0+cbWidth is greater than pic width in luma samples
  y0+cbHeight is less than or equal to pic height in luma samples
Otherwise, if all of the following conditions are true, allowBtSplit is set equal to FALSE:
//according to TT partition in above level (mttDepth−1)
  mttDepth is greater than 0
  partIdx is equal to 1
  MttSplitMode[x0][y0][mttDepth−1] is equal to parallelTtSplit
//according to transform sizes (e.g., when MaxTbSizeY is equal to 64, for 64×128, no vertical BT; for 128×64, no horizontal BT)
Otherwise if all of the following conditions are true, allowBtSplit is set equal to FALSE
  btSplit is equal to SPLIT BT VER
  cbWidth is less than or equal to MaxTbSizeY
  cbHeight is greater than MaxTbSizeY
Otherwise if all of the following conditions are true, allowBtSplit is set equal to FALSE
  btSplit is equal to SPLIT_BT_HOR
  cbWidth is greater than MaxTbSizeY
  cbHeight is less than or equal to MaxTbSizeY
Otherwise, allowBtSplit is set equal to TRUE.

2.4.2.1.3 Allowed Ternary Split Process
Inputs to this process are:
a ternary split mode ttSplit,
a coding block width cbWidth,
a coding block height cbHeight,
a location (x0, y0) of the top-left luma sample of the considered coding block relative to the top-left luma sample of the picture,
a multi-type tree depth mttDepth
a maximum multi-type tree depth with offset maxMttDepth,
a maximum binary tree size maxTtSize.
Output of this process is the variable allowTtSplit.

TABLE 2

Specification of cbSize based on ttSplit

| | ttSplit == SPLIT_TT_VER | ttSplit == SPLIT_TT_HOR |
|---|---|---|
| cbSize | cbWidth | cbHeight |

The variable cbSize is derived as specified in Table 2.
The variable allowTtSplit is derived as follows:
If one or more of the following conditions are true, allowTtSplit is set equal to FALSE:
//according to block size
  cbSize is less than or equal to 2*MinTtSizeY
  cbWidth is greater than Min(MaxTbSizeY, maxTtSize)
  cbHeight is greater than Min(MaxTbSizeY, maxTtSize)
//according to maximum allowed MTT depth
  mttDepth is greater than or equal to maxMttDepth //according to whether it is located at picture boundary
    x0+cbWidth is greater than pic width in luma samples
    y0+cbHeight is greater than pic height in luma samples
Otherwise, allowTtSplit is set equal to TRUE.

2.5 Partition Tree Structure in AVS3

In AVS3, Extended Quad-tree (EQT) partitioning is adopted, which further extends the QTBT scheme and increases the partitioning flexibility. More specially, EQT splits a parent CU into four sub-CUs of different sizes, which can adequately model the local image content that cannot be elaborately characterized with QTBT. Meanwhile, EQT partitioning allows the interleaving with BT partitioning for enhanced adaptability.

Figure 7B:
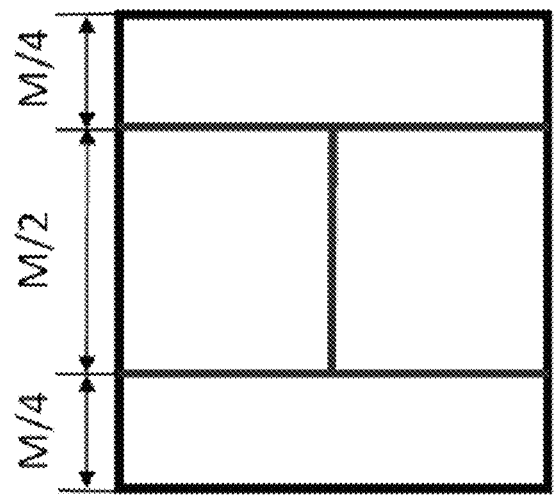
FIGS. 7A and 7B show examples of extended quad-tree (EQT) horizontal and vertical modes, respectively.
Figure 7A:
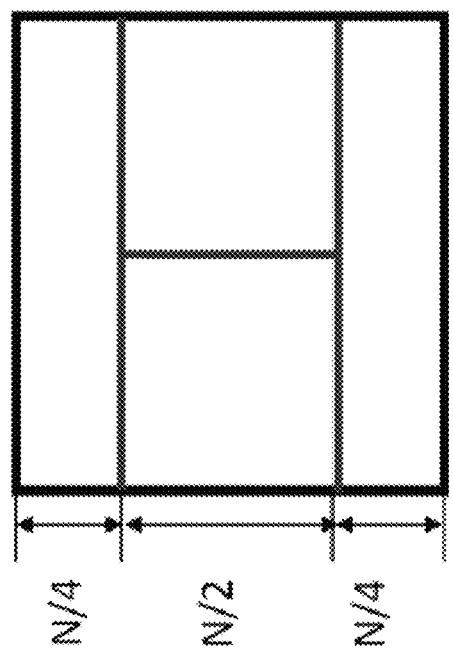

With the EQT partitioning, a parent CU is split into four sub-CUs with different sizes. As shown in FIG. 7, EQT divides a M×N parent CU into two M×N/4 CUs and two M/2×N/2 CUs in the horizontal direction. Analogously, EQT vertical partitioning generates two N×M/4 CUs and two M/2×N/2 CUs. In particular, EQT sub-blocks size is always the power of 2, such that additional transformations are not necessarily involved.

Figure 8:
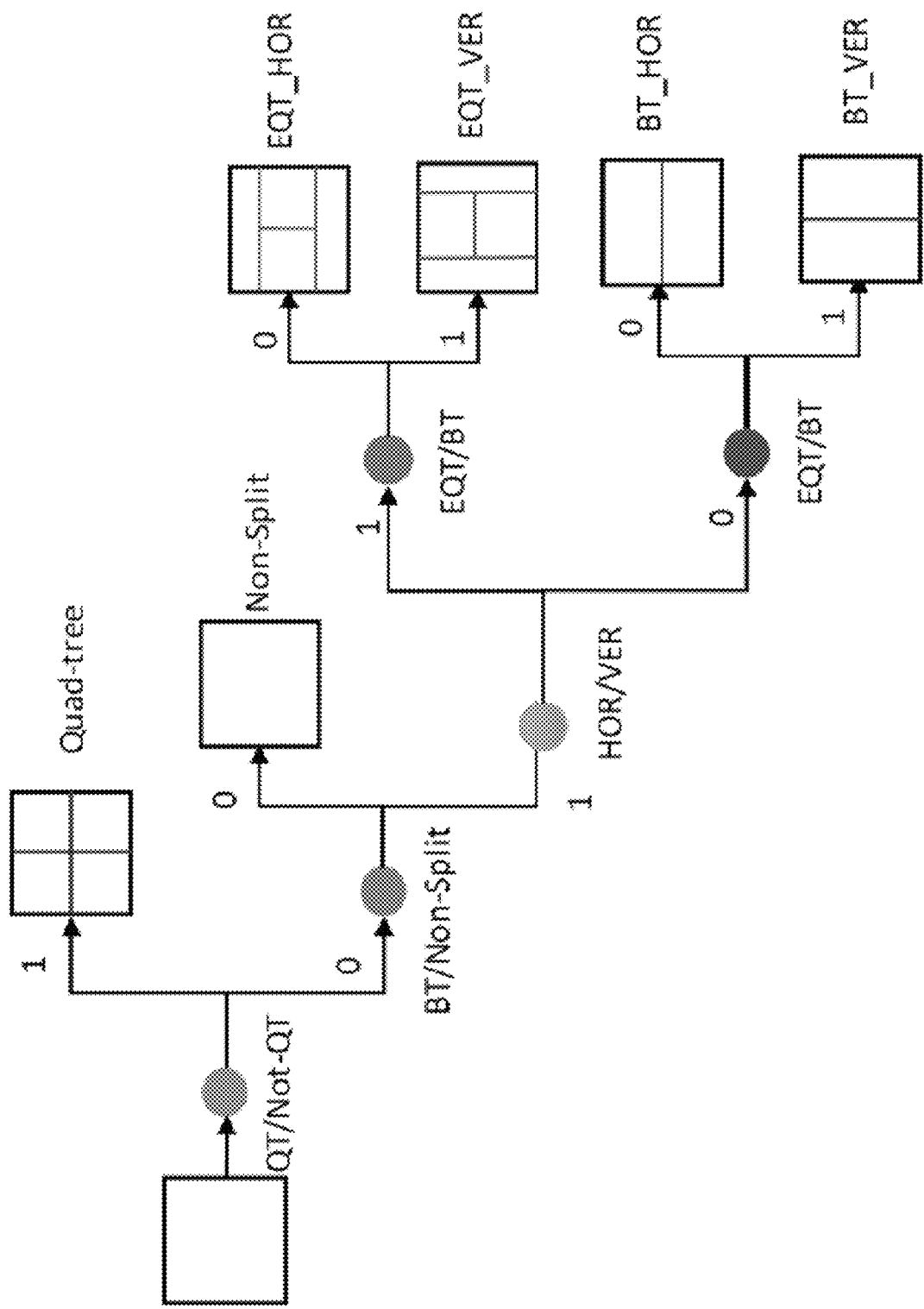
FIG. 8 shows an example of a signaling structure of QTBT plus EQT partitioning.
Figure 9B:
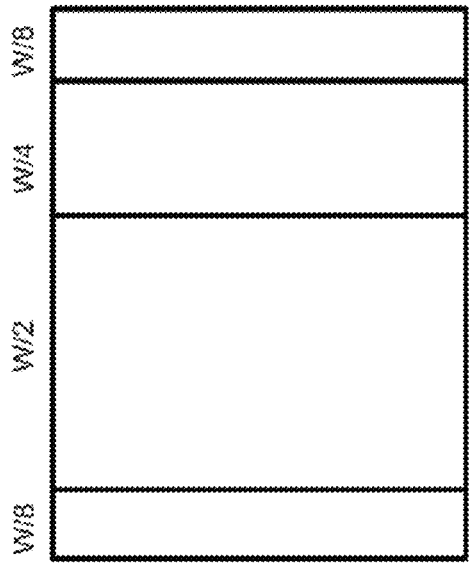
FIGS. 9A-9H show examples of unsymmetrical quad-tree (UQT) partitioning.
Figure 9D:
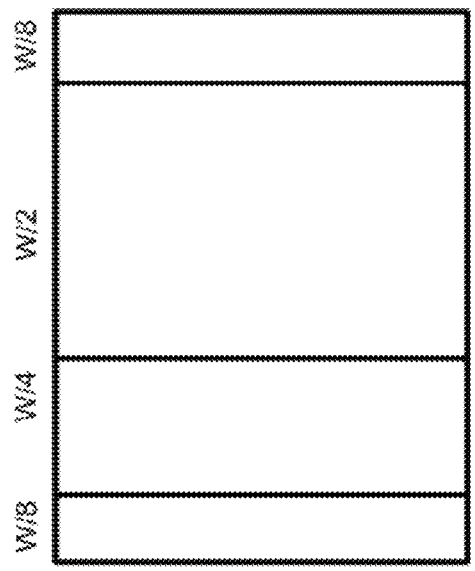
Figure 9A:
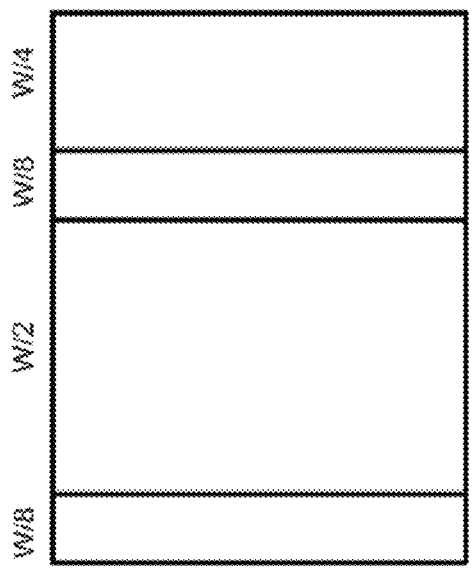
Figure 9C:
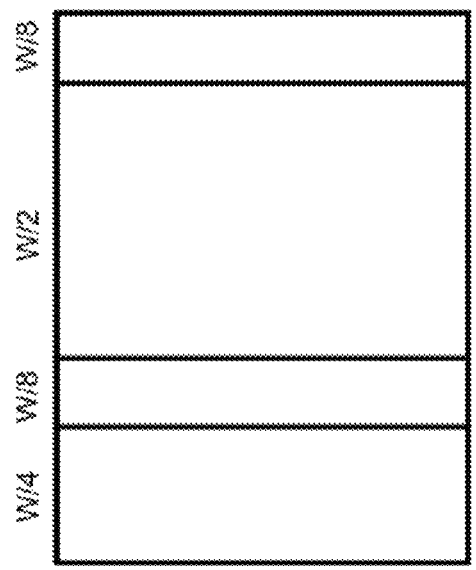
Figure 9E:
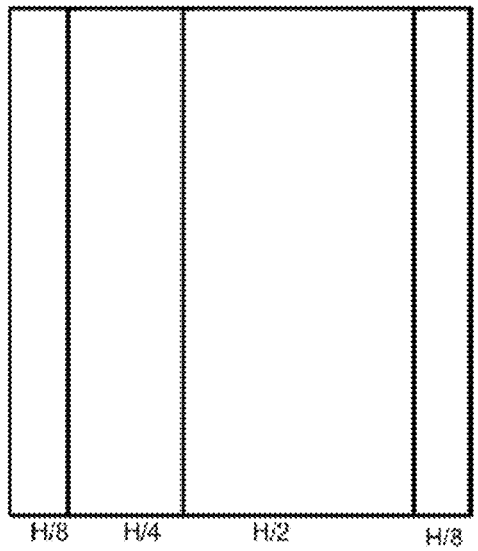
Figure 9G:
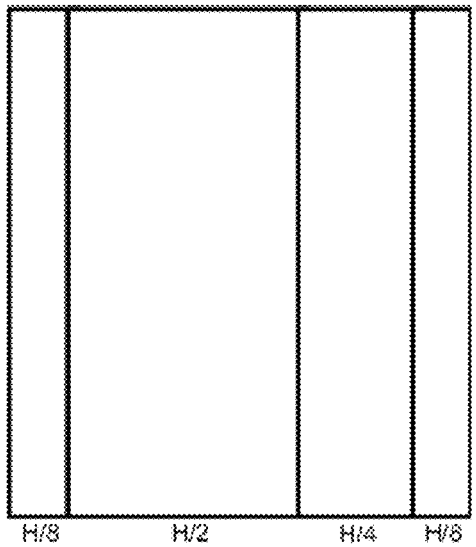
Figure 9F:
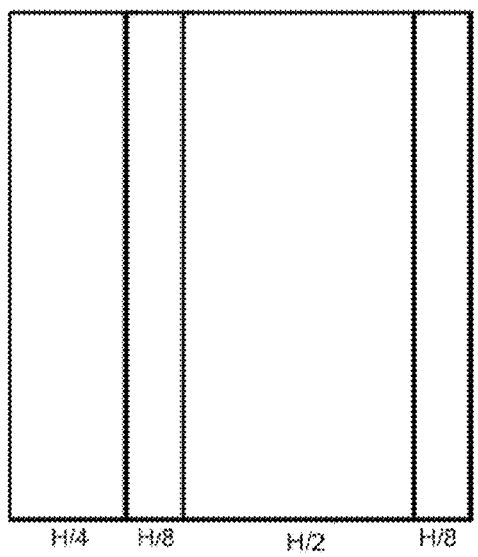
Figure 9H:
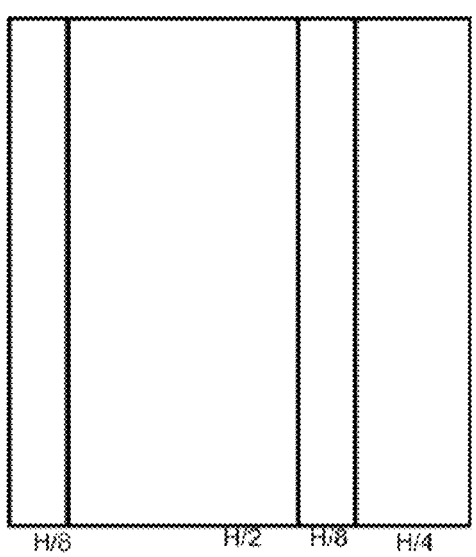

In the structure of QTBT, a QT splitting flag is first signaled to indicate whether the current CU is split by QT. As such, when this ag is false, the second signal will be encoded to denote whether the current CU splitting mode is non-splitting or BT splitting. For a BT splitting CU, the third bin (DIR) is signaled to discriminate horizontal BT or vertical BT splitting. When EQT partitioning is introduced, one additional bin termed as isEQT is signaled to indicate whether it is an EQT-split, in case that BT and EQT are both available, as shown in FIG. 8.

2.6 UQT

Unsymmetrical Quad-Tree (UQT) partitioning is proposed in our P1809119401H. With UQT, a block with dimensions W×H is split into four partitions with dimensions W1×H1, W2×H2, W3×H3 and W4×H4, where W1, W2, W3, W4, H1, H2, H3, H4 are all integers. All the parameters are in the form of power of 2. For example, W1=2N1, W2=2N2, W3=2N3, W4=2N4, H1=2M1, H2=2M2, H3=2M3, H4=2M4. Some examples are shown in FIGS. 9A-9F.

3. Drawbacks and Problems in Existing Systems

Although the QT/BT/TT coding tree structure in VVC is quite flexible, there is still some partitioning patterns that cannot be attained by QT/BT/TT/EQT/UQT.

4. Exemplary Methods for Quinary Tree Partitioning

To address the problem, several methods are proposed to introduce other kinds of partition structures that may split one block to more than 4 partitions.

The detailed inventions below should be considered as examples to explain general concepts. These embodiments should not be interpreted in a narrow way. Furthermore, these embodiments can be combined in any manner.

In the following discussion, partition trees may indicate QT, BT, TT or Unsymmetrical Quad-Tree (UQT), EQT or others. While partition/splitting directions may indicate the horizontal splitting or vertical splitting or diagonal splitting or others. One partition is denoted by its partition tree type and partition direction.

QT, BT, TT, UQT, or EQT may refer to "QT split", "BT split", "TT split", "UQT split", "EQT split", respectively.

In the following discussion, "split" and "partitioning" have the same meaning. The proposed methods may be also applicable to existing partition trees.

Definitions of Proposed Partition Types

Figure 10A:
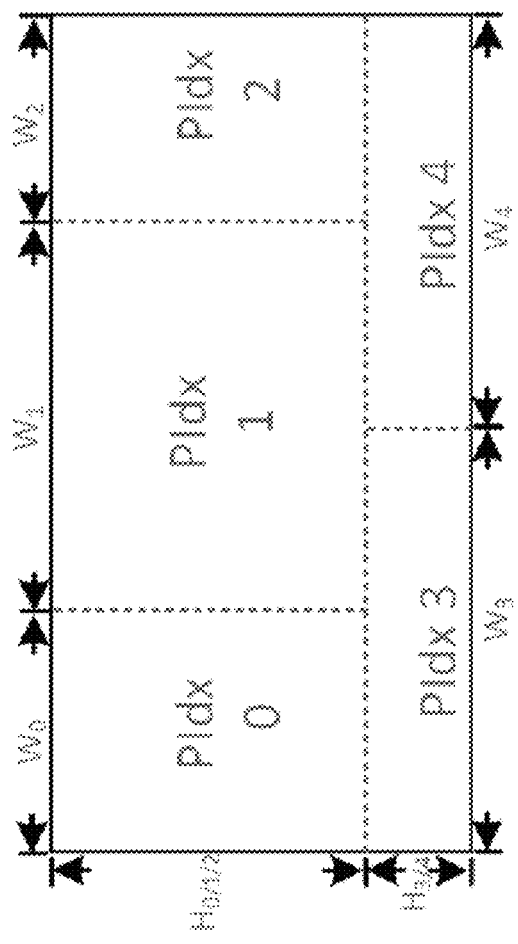
FIGS. 10A-10E show examples of quinary tree (QUI-T) partitioning.
Figure 10B:
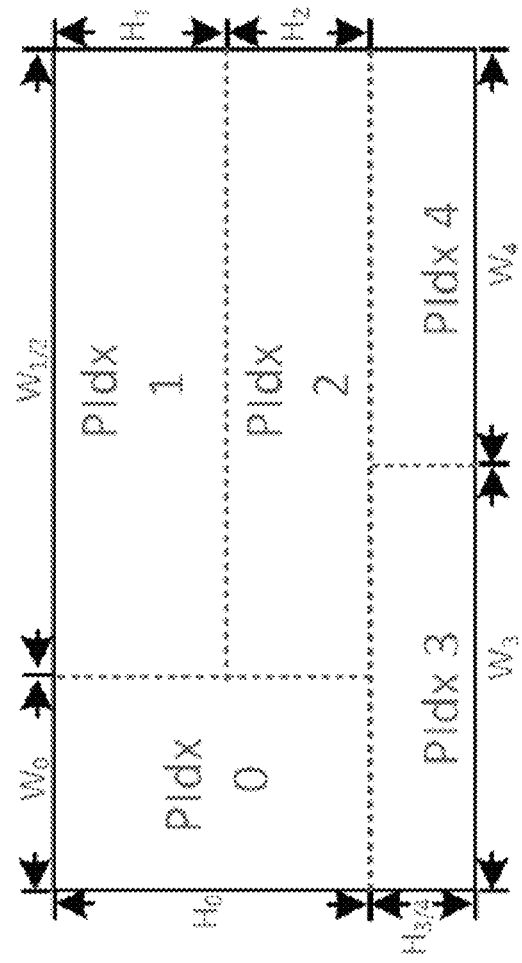
Figure 10C:
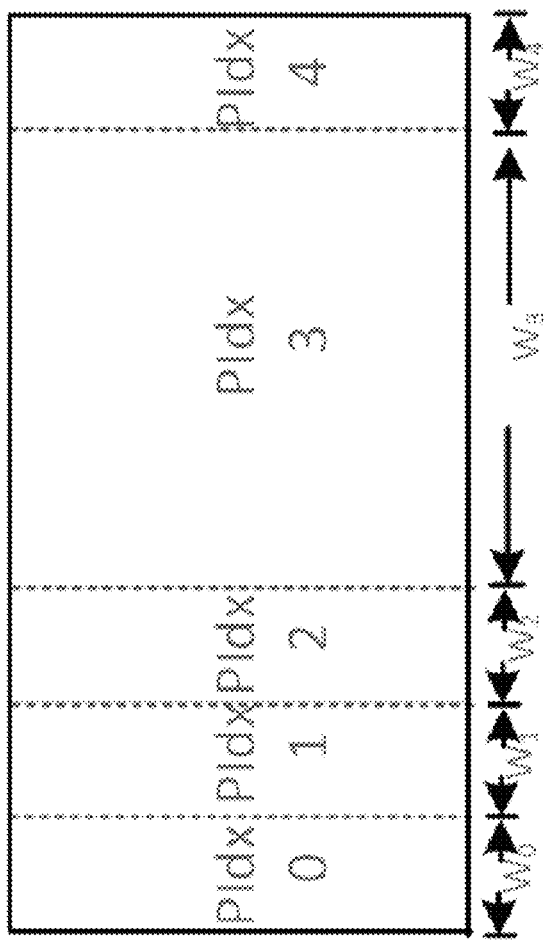
Figure 10D:
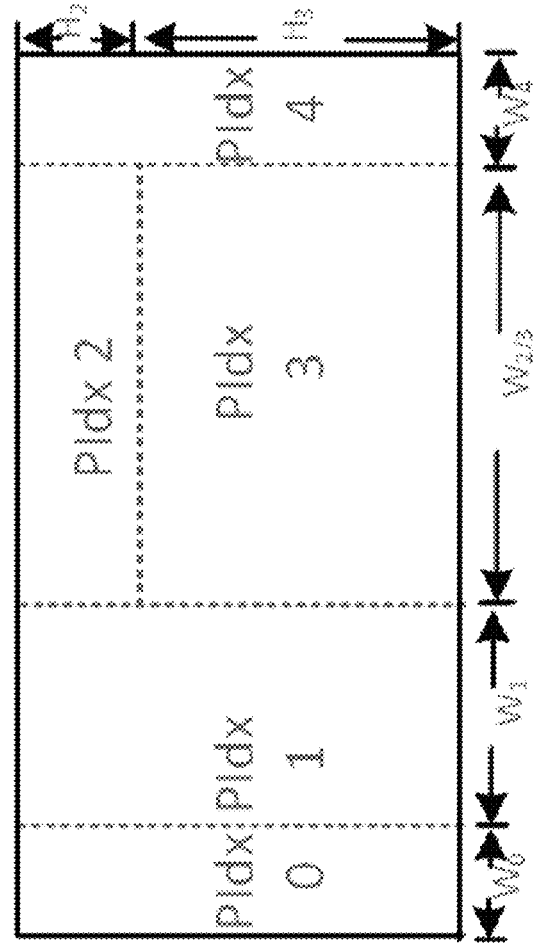
Figure 10E:
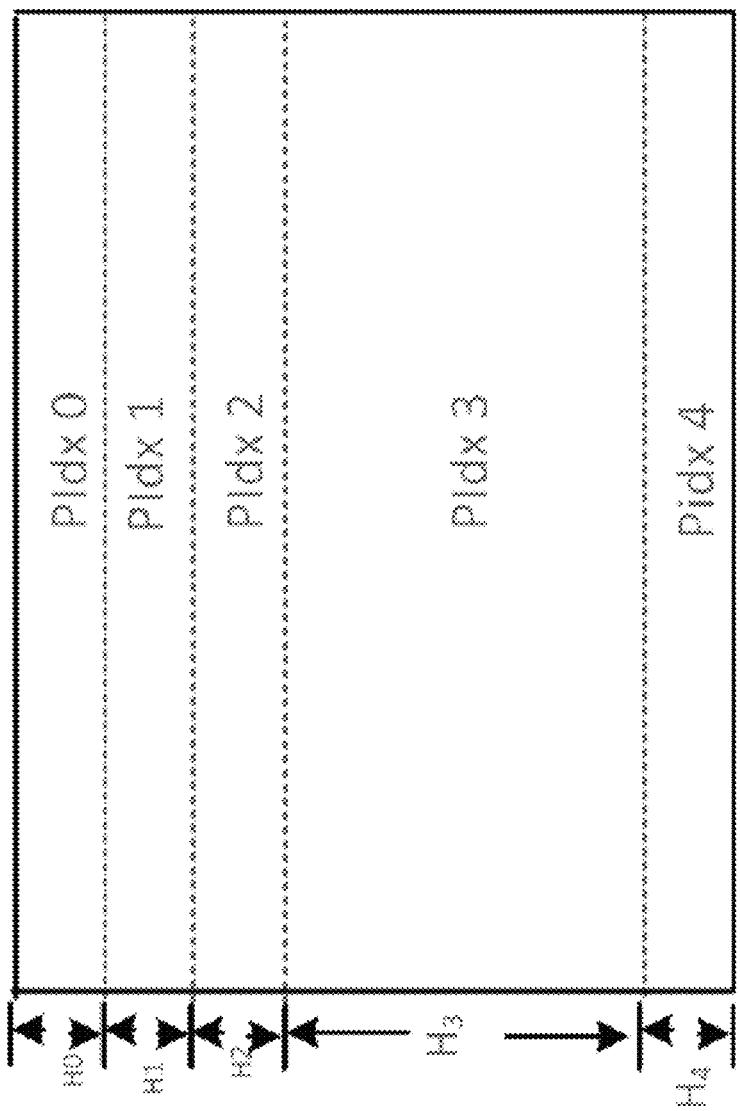

1. Quinary-Tree (QUI-T) partitioning is proposed. With QUI-T, a block with dimensions W×H is split into five smaller blocks. When the indication of using such partitioning is true, such a block is directly split into five smaller ones (a.k.a. split child blocks). The smaller one may be treated as a coding unit/a prediction unit/a transform unit. Each dimension of the smaller block may be denoted by $W_i \times H_i$ (i being 0 . . . 4, indicating the partition index) and $W_i$, $H_i$ are all integers.

a. In one example, each smaller block may be further split into even smaller blocks, such as in a recursive way.
  b. In one example, all the dimensions are in the form of power of 2.
     i. For example, W0=2N0, W1=2N1, W2=2N2, W3=2N3, W4=2N4, H0=2M0, H1=2M1, H2=2M2, H3=2M3, H4=2M4.
  c. In one example, QUI-T split one block in both horizontal and vertical directions. Such case is named as mixed direction. FIGS. 10A, 10B and 10D give some examples.
     i. For example, at least one of Wi is unequal to W.
     ii. For example, at least one of Hi is unequal to H.
  d. In one example, QUI-T only splits one block in vertical direction.
     i. For example, H0=H1=H2=H3=H4=H. FIG. 10C gives an example.
  e. In one example, QUI-T only splits one block in horizontal direction.
     i. For example, W0=W1=W2=W3=W4=W. FIG. 10E gives an example.
  f. In one example, one of the partitions (with size equal $W_x \times H_x$) to has different block sizes compared to others.
     i. In one example, the other four partitions are with same sizes.
     ii. In one example, $W_x = \frac{1}{2}W$ and $W_y = \frac{1}{8}W$ (y !=x) with x being a value within the range [0, 4]. Alternatively, furthermore, x is equal to 1 or 3.
        1. FIG. 10C gives an example wherein $W3 = \frac{1}{2}W$ and $W_y = \frac{1}{8}W$ (y !=3).
     iii. In one example, $H_x = \frac{1}{2}H$ and $H_y = \frac{1}{8}H$ (y !=x). Alternatively, furthermore, x is equal to 1 or 3.
     iv. In one example, $W_x = W - ((W/5) << 2)$ and $W_y = W/5$ (y !=x) with x being a value within the range [0, 4].
     v. In one example, $W_x = W - ((W/M) << 2)$ and $W_y = W/M$ (y !=x) wherein M is an integer value, such as 8, 16, 32, 64.
  g. In one example, two of the partitions may have equal size (with size equal $W_x \times H_x$), the others are with equal sizes but different from these two.
     i. In one example, $W_x = \frac{1}{8}W$ and $W_y = \frac{1}{4}W$ (for all y that y !=x). Alternatively, furthermore, x being equal to 0 and 3. Alternatively, furthermore, x being equal to 0 and 4. Alternatively, furthermore, x being equal to 1 and 3. Alternatively, furthermore, x being equal to 1 and 4.
        1. FIG. 10C gives an example wherein $W_1 = W_3 = \frac{1}{8}W$ and $W_y = \frac{1}{4}W$ (y !=3 && y!=1).
     ii. In one example, $H_x = \frac{1}{8}H$ and $H_y = \frac{1}{4}H$ (for all y that y !=x). Alternatively, furthermore, x being equal to 0 and 3. Alternatively, furthermore, x being equal to 0 and 4. Alternatively, furthermore, x being equal to 1 and 3. Alternatively, furthermore, x being equal to 1 and 4.
  h. In one example, two of the partitions may have equal size (with size equal $W_x \times H_x$), the other three may have different sizes.
     i. In one example, $W_x = \frac{1}{16}W$ for the two with equal sizes; and $W_i = \frac{2}{16}W$; $W_j = \frac{4}{16}W$ and $W_k = \frac{8}{16}W$, wherein i, j, k are unequal to x.

Figures 11A, 11B:
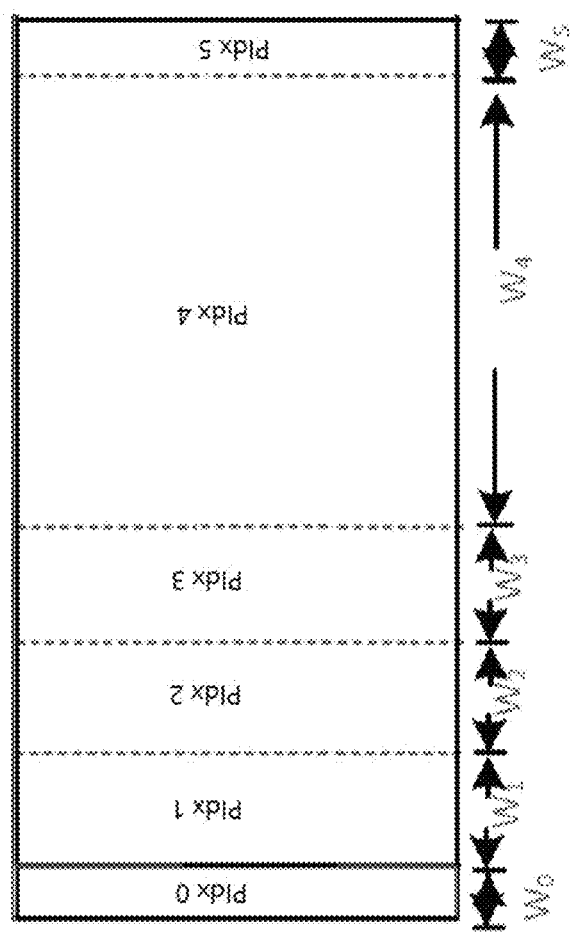
FIGS. 11A and 11B show examples of senary-partition structures.

1. FIG. 10C gives an example wherein $W_0=W4=1/16$ W; $W_1=2/16$ W; $W_2=4/16$ W and $W_3=8/16$ W
    ii. In one example, $H_x=1/16 H$ for the two with equal sizes; and $H_i=2/16$ W; $H_j=4/16$ W and $H_k=8/16$ W, wherein i, j, k are unequal to x.
    iii. Alternatively, two of the five partitions may have equal size (with size equal $W_x \times H_x$), two of the remaining three are with the same size.
i. In the above and below description, $1/16$ W or $1/8$ W mean $1/16 \times W$ or $1/8 \times W$, or noted as W/16 or W/8.
j. In one example, $W_0=W_4=W/8$ and $W_1=W_2=W_3=W/4$, $H_0=H_1=H_2=H_3=H_4=H$.
k. In one example, $H_0=H_4=H/8$ and $H_1=H_2=H_3=H/4$, $W_0=W_1=W_2=W_3=W_4=W$.
l. In one example, one or multiple splits are not allowed for one or more child blocks when the current block is split by quinary-split.
    i. For example, if the current block is split by quinary-split into five child-block: B0: W/8×H, B1: W/4×H, B2: W/4×H, B3: W/4×H, B4: W/8×H, then:
        1. In one example, Bx is not allowed to be split by vertical BT, where x may be one or some of 0, 1, 2, 3, 4;
        2. In one example, Bx is not allowed to be split by vertical TT, where x may be one or some of 0, 1, 2, 3, 4;
        3. In one example, Bx is not allowed to be split by horizontal BT, where x may be one or some of 0, 1, 2, 3, 4;
        4. In one example, Bx is not allowed to be split by horizontal TT, where x may be one or some of 0, 1, 2, 3, 4;
        5. In one example, Bx is not allowed to be split by QT, where x may be one or some of 0, 1, 2, 3, 4;
    ii. For example, if the current block is split by quinary-split into five child-block: B0: W×H/8, B1: W×H/4, B2: W×H/4, B3: W×H/4, B4: W×H/8, then:
        1. In one example, Bx is not allowed to be split by horizontal BT, where x may be one or some of 0, 1, 2, 3, 4;
        2. In one example, Bx is not allowed to be split by horizontal TT, where x may be one or some of 0, 1, 2, 3, 4;
        3. In one example, Bx is not allowed to be split by vertical BT, where x may be one or some of 0, 1, 2, 3, 4;
        4. In one example, Bx is not allowed to be split by vertical TT, where x may be one or some of 0, 1, 2, 3, 4;
        5. In one example, Bx is not allowed to be split by QT, where x may be one or some of 0, 1, 2, 3, 4;
m. The above methods may be extended to other Senary-, Septenary-, Octonary-Tree partitions (SnT, StT, OctT) wherein one block may be split to 6, 7, or 8 smaller blocks. Examples of senary-tree partitions are shown in FIGS. 11A and 11B.
n. Some exemplary partitions are depicted in FIGS. 10A-10E.
o. The coding order (denoted by PIdx 0 . . . 4) may be different from that defined in FIGS. 10A-10E.
    i. The coding order for one QUI-T pattern may be pre-defined.
    ii. Alternatively, multiple coding orders may be pre-defined for one QUI-T pattern, and one block may choose one from them, such as via signaling the indication of selected coding order or derivation at the decoder side.

Interaction with Other Partition Types
2. A block which is split into child blocks by QUI-T, may be split from a parent block by one or some specific kinds of split methods.
    a. A block which may allow QUI-T partitions, may be a block generated by QT or BT or TT or QUI-T partitions.
    b. For example, a block which is split into child blocks by QUI-T, can only be split from a parent block by QT.
    c. A block which may allow QUI-T partitions, may be a root block.
3. A block which is split from a parent block by QUI-T, may be further split into child blocks by one or multiple other partition types (such as QT, BT, TT, QUI-T, UQT).
    a. For example, a block which is split from a parent block by QUI-T, may be further split into child blocks by BT and/or TT.
    b. For example, a block which is split from a parent block by QUI-T, may be further split into child blocks by BT and/or TT, and/or QUI-T, but not QT.
    c. For example, a block which is split from a parent block by QUI-T, may be further split into child blocks by QUI-T and/or QT, but not BT/TT.
    d. For example, a block which is split from a parent block by QUI-T, cannot be further split into child blocks by QT.
    e. Alternatively, QUI-T split blocks may be not further split into child blocks.
4. When a parent block is split into child blocks by QUI-T, the split depth of the child block may be derived from the split depth of the parent block.
    a. In one example, the splitting due to QUI-T may be used to update the QT/BT/TT/QUI-T/MTT depth.
        i. In one example, the QT depth of one or all of the child blocks is equal to the QT depth of the parent block added by 1.
        ii. In one example, the BT depth of one or all of the child blocks is equal to the BT depth of the parent block added by 1.
        iii. In one example, the TT depth of one or all of the child blocks is equal to the TT depth of the parent block added by 1.
        iv. In one example, the QUI-T depth of one or all of the child blocks is equal to the QUI-T depth of the parent block added by 1.
        v. In one example, the MTT depth of one or all of the child block is equal to the MTT depth of the parent block added by 1.
            1. For example, the MTT depth of the child block is equal to the MTT depth of the parent block added by 1 if the parent block is split into child blocks by BT.
            2. For example, the MTT depth of the child block is equal to the MTT depth of the parent block added by 1 if the parent block is split into child blocks by TT.
    b. In one example, the QUI-T/BT/TT/QT/MTT depth increasement for different child block may be different.
        i. The depth increasement is dependent on the ratio of a child block compared to the parent block.

Restrictions of Usage of QUI-T
5. In one example, the maximum/minimum block size that could allow QUI-T partitions and/or the maximum bit depth and/or maximum depth that could allow QUI-T partitions may be signaled in SPS/PPS/VPS/APS/sequence header/picture header/slice header/tile group header/CTU row/regions, etc.

a. The maximum/minimum block size that could allow QUI-T partitions and/or the maximum depth that could allow QUI-T partitions may be derived from other values, such as depth for MTT or depth of QT.
b. The maximum block that allows QUI-T partitions, may be the largest coding block (coding tree block or coding tree unit).
c. For example, the maximum block that allows QUI-T partitions, may be the virtual pipeline data unit (VPDU).
d. In one example, the maximum/minimum block size that could allow QUI-T partitions and/or the maximum depth that could allow QUI-T partitions may be dependent on profile/level/tier of a standard.
e. In one example, the maximum/minimum block size that could allow QUI-T partitions and/or the maximum depth that could allow QUI-T partitions may be derived, such as to be the same as that for QT partitions.
f. In one example, the maximum/minimum block size that could allow QUI-T partitions and/or the maximum depth that could allow QUI-T partitions may be dependent on tile group tile/slice type/color component/dual tree is enabled or not.
g. In one example, the maximum/minimum block size that could allow QUI-T partitions and/or the maximum depth that could allow QUI-T partitions may be different for different QUI-T patterns.
h. When one block is split according to QUI-T, the corresponding depth of QUI-T of one smaller block may be adjusted (e.g., increased by 1) accordingly.
   i. Alternatively, the corresponding depth of a certain partition (e.g., QT) of one smaller block may be adjusted (e.g., increased by 1) accordingly.
   ii. Alternatively, the corresponding depth of MTT of one smaller block may be adjusted (e.g., increased by 1) accordingly.
   iii. The adjustment of corresponding depth of different smaller blocks may be done in the same way (e.g., increase by 1)
      1. Alternatively, the adjustment of corresponding depth of different smaller blocks may be done in the different way (e.g., increase by 1). For example, the adjustment is dependent on block dimension of the smaller block.
6. QUI-T is not allowed if a split child block cross more than one Virtual pipeline data units (VPDUs).
   a. Alternatively, QUI-T is still allowed, however, such child block is forced to be further split until no child block crosses more than one VPDU.
7. QUI-T is not allowed if the width/height of the current block (or any of the split child block) satisfy some conditions. (Suppose the width and height of the current block are W and H, T1, T2 and T are some integers)
   a. QUI-T is not allowed if W>=T1 and H>=T2;
   b. QUI-T is not allowed if W>=T1 or H>=T2;
   c. QUI-T is not allowed if W<=T1 and H<=T2;
   d. QUI-T is not allowed if W<=T1 or H<=T2;
   e. QUI-T is not allowed if W×H<=T;
   f. QUI-T is not allowed if W×H>=T;
   g. Horizontal QUI-T is not allowed if H<=T; For example, T=16.
   h. Horizontal QUI-T is not allowed if H>=T; For example, T=128.
   i. Vertical QUI-T is not allowed if W<=T; For example, T=16.
   j. Vertical QUI-T is not allowed if W>=T; For example, T=128.
   k. T1, T2 and T may be signaled from the encoder to the decoder in VPS/SPS/PPS/picture header/slice header/tile group header/tile header.
   l. T1, T2 and T may depend on color components. For example, T1, T2 and T may be different for luma and chroma components.
      i. In one example, the signaled thresholds such as T1, T2 and/or T may be shared by QUI-T and TT.
      ii. In one example, the signaled thresholds such as T1, T2 and/or T may be shared by QUI-T and BT.
   m. T1, T2 and T may depend on whether luma coding tree and chroma coding tree are separated. For example, T1, T2 and T may be different for luma and chroma components if luma coding tree and chroma coding tree are separated.
   n. Alternatively, when the transform is not supported for at least one child block due to QUI-T, QUI-T split is invalid.
   o. Alternatively, when the depth of one block exceeding the allowed depth for QUI-T splitting, QUI-T split is invalid.
   p. Alternatively, when any of a child block size is smaller than the allowed block size due to QUI-T splitting, QUI-T split is invalid.
8. QUI-T is allowed if the width/height of the current block (or any of the split child block) satisfy some conditions. (Suppose the width and height of the current block are W and H, T1, T2 and T are some integers)
   a. QUI-T is allowed if W>=T1 and H>=T2;
   b. QUI-T is allowed if W>=T1 or H>=T2;
   c. QUI-T is allowed if W<=T1 and H<=T2;
   d. QUI-T is allowed if W<=T1 or H<=T2;
   e. QUI-T is allowed if W×H<=T;
   f. QUI-T is allowed if W×H>=T;
   g. Horizontal QUI-T is allowed if H<=T; For example, T=64.
   h. Horizontal QUI-T is allowed if H>=T; For example, T=32.
   i. Vertical QUI-T is allowed if W<=T; For example, T=64.
   j. Vertical QUI-T is allowed if W>=T; For example, T=32.
   k. T1, T2 and T may be signaled from the encoder to the decoder in VPS/SPS/PPS/picture header/slice header/tile group header/tile header.
      i. In one example, the signaled thresholds such as T1, T2 and/or T may be shared by QUI-T and TT.
      ii. In one example, the signaled thresholds such as T1, T2 and/or T may be shared by QUI-T and BT.
   l. T1, T2 and T may depend on color components. For example, T1, T2 and T may be different for luma and chroma components.
   m. T1, T2 and T may depend on whether luma coding tree and chroma coding tree are separated. For example, T1, T2 and T may be different for luma and chroma components if luma coding tree and chroma coding tree are separated.
9. QUI-T is not allowed if the depth of the current block satisfy some conditions. The depth of the current block may refer to QT depth, BT depth, TT depth, QUI-T depth or MTT depth.
   a. QUI-T is not allowed if the split depth<=T;
   b. QUI-T is not allowed if the split depth>=T;
   c. QUI-T is not allowed if the QT split depth<=T;
   d. QUI-T is not allowed if the QT split depth>=T;
   e. QUI-T is not allowed if the BT split depth>=T;
   f. QUI-T is not allowed if the BT split depth<=T;
   g. QUI-T is not allowed if the TT split depth>=T;
   h. QUI-T is not allowed if the TT split depth>=T;

i. QUI-T is not allowed if the QUI-T split depth<=T;
j. QUI-T is not allowed if the QUI-T split depth>=T;
k. QUI-T is not allowed if the MTT split depth<=T;
l. QUI-T is not allowed if the MTT split depth>=T;
m. T may be signaled from the encoder to the decoder in VPS/SPS/PPS/picture header/slice header/tile group header/tile header.
n. T may depend on color components. For example, T1, T2 and T may be different for luma and chroma components.
o. T may depend on whether luma coding tree and chroma coding tree are separated. For example, T1, T2 and T may be different for luma and chroma components if luma coding tree and chroma coding tree are separated.

10. QUI-T is allowed if the depth of the current block satisfy some conditions. The depth of the current block may refer to QT depth, BT depth, TT depth, QUI-T depth or MTT depth.
    a. QUI-T is allowed if the split depth<=T;
    b. QUI-T is allowed if the split depth>=T;
    c. QUI-T is allowed if the QT split depth<=T;
    d. QUI-T is allowed if the QT split depth>=T;
    e. QUI-T is allowed if the BT split depth>=T;
    f. QUI-T is allowed if the BT split depth<=T;
    g. QUI-T is allowed if the TT split depth>=T;
    h. QUI-T is allowed if the TT split depth>=T;
    i. QUI-T is allowed if the QUI-T split depth<=T;
    j. QUI-T is allowed if the QUI-T split depth>=T;
    k. QUI-T is allowed if the MTT split depth<=T;
    l. QUI-T is allowed if the MTT split depth>=T;
    m. T may be signaled from the encoder to the decoder in VPS/SPS/PPS/picture header/slice header/tile group header/tile header.
    n. T may depend on color components. For example, T1, T2 and T may be different for luma and chroma components.
    o. T may depend on whether luma coding tree and chroma coding tree are separated. For example, T1, T2 and T may be different for luma and chroma components if luma coding tree and chroma coding tree are separated.

11. Whether and how to use QUI-T may depend on the position of the current block. For example, whether and how to use QUI-T may depend on the whether the current block crosses the picture/tile/tile group border or not.
    a. In one example, vertical QUI-T is not allowed if the current block crosses the picture/tile/tile group bottom border.
    b. In one example, horizontal QUI-T is not allowed if the current block crosses the picture/tile/tile group bottom border.
    c. In one example, vertical QUI-T is not allowed if the current block crosses the picture/tile/tile group right border.
    d. In one example, horizontal QUI-T is not allowed if the current block crosses the picture/tile/tile group right border.
    e. In one example, mixed QUI-T may be not allowed if the current block crosses the picture/tile/tile group right border.
    f. In one example, mixed QUI-T may be not allowed if the current block crosses the picture/tile/tile group bottom border.
    g. In one example, if a child block split by QUI-T is totally out of the picture/tile/tile group, the child block may be omitted in the encoding/decoding process.
    h. In one example, if a child block split by QUI-T is partially out of the picture/tile/tile group, the following may apply
        i. The part out of the picture may be omitted in the encoding/decoding process.
        ii. The part inside the picture may be further split.
        iii. The part inside the picture may be coded as a CU.
            1. Whether the part inside the picture is coded as a CU may depend on the width (w) and height (h) of the part.
                a. In one example, the part inside the picture may be coded as a CU if $w=2n_w$, $h=2n_h$, where $n_w$ and $n_h$ are integers.
    i. In one example, if any child block split by QUI-T is partially/fully out of the picture/tile/tile group, QUI-T is disallowed.

12. When QUI-T or certain QUI-T pattern is disallowed, the signaling of indication of the usage of the pattern may be also skipped.
    a. Alternatively, it may be still signaled but is constrained to be false in a conformance bitstream.

13. When a child block is split from QUI-T, the child block may not be allowed to be further split with one or more splitting methods as:
    a. QT
    b. horizontal BT
    c. vertical BT
    d. horizontal TT
    e. vertical BT
    f. horizontal UQT
    g. vertical UQT
    h. QUI-T It is proposed to QUI-T may be only applied to the leaf nodes, e.g., when one block is not further split according to other partitions.
    i. In one example, a flag may be signaled for the leaf node whether to use QUI-T or not.
        i. Alternatively, furthermore, indications of which kind QUI-T may be further signaled.
    j. Alternatively, indications of disabling QUI-T or which kind QUI-T may be signaled for the leaf node.

Indications of Usage of QUI-T

14. Whether to apply QUI-T and/or which kind QUI-T is applied may be signaled from encoder to decoder.
    a. In one example, it may be signaled in VPS/SPS/PPS/sequence header/picture header/slice header/tile group header/tile header to indicate whether QUI-T can be applied.
    b. In one example, it may be signaled in VPS/SPS/PPS/sequence header/picture header/slice header/tile group header/tile header to indicate which kinds of QUI-T can be applied.
    c. In one example, it may be signaled in a block to indicate whether QUI-T is used to split that block.
    d. In one example, it may be signaled in a block to indicate which kind of QUI-T is used to split that block.
    e. In one example, different QUI-T sets may be designed for different block shapes/sizes.
    f. In one example, different QUI-T sets may be designed for pictures/tiles/slices with different temporal layers.
    g. In one example, whether or how to apply QUI-T may depend on the video resolution/picture resolution/coded modes/video characteristics (screen content or camera captured sequence or mixed content)/slice type/picture type/tile group type/low delay check flag.

15. One syntax element may be signaled to indicate no split or partition (including partition tree type and split directions).
   a. Alternatively, one syntax element may be firstly signaled to indicate whether to split or not; and another syntax element may be signaled to indicate the partition.
16. Indication of partition may be represented by two syntax element: selected partition tree type may be firstly signaled, followed by splitting direction if needed.
   a. In one example, an index of partition tree type may be signaled in a block to indicate whether a block is split by QT, or QUI-T or non-split.
      i. Alternatively, furthermore, the splitting direction (horizonal/vertical/mixed direction) and/or splitting patterns may be further signaled.
   b. In one example, an index of partition tree type may be signaled in a block to indicate whether a block is split by BT, or TT, or QUI-T.
      i. For example, this index may be conditionally signaled, such as only when at least one of BT, TT and QUI-T is valid for this block.
      ii. Alternatively, furthermore, the splitting direction (horizonal/vertical) and/or splitting patterns may be further signaled.
   c. Alternatively, indication of splitting direction may be firstly signaled, followed by partition tree type (such as QT, TT, QUI-T).
      i. In one example, a flag is signaled in a block to indicate whether a block is vertical split or horizontal split. The vertical split may be BT vertical split, TT vertical split or QUI-T vertical split. The horizontal split may be BT horizontal split, TT horizontal split or QUI-T horizontal split.
      ii. For example, this flag is signaled only when the block is split by BT, or TT, or QUI-T.
      iii. For example, this flag is signaled only when both vertical split and horizontal split are valid for this block.
         1. If only vertical split is valid, the flag is not signaled, and horizontal split is inferred to be used.
         2. If only horizontal split is valid, the flag is not signaled, and vertical split is inferred to be used.
   d. In one example, a binarized code is signaled in a block to indicate which kind of split (BT, TT, or a kind of QUI-T) is used. In following examples, X represents 0 or 1 and Y=~X (Y=1 if X=0 and Y=0 if X=1).
      i. In one example, the candidate BT, TT or QUI-Ts to be signaled are all vertical splits or horizontal splits depending on previously signaled or derived information.
      ii. In one example, a first flag is signaled to indicate whether QUI-T is used. For example, the binarized codewords orderly to represent BT, TT, QUI-T1, QUI-T2, QUI-T3 and QUI-T4 are XX, XY, YXX, YXY, YYX, YYY.
         1. In an alternative example, the binarized codewords orderly to represent BT, TT, QUI-T1 are XX, XY, Y.
      iii. In one example, truncated unary code is applied. For example, the binarized codewords orderly to represent BT, TT, QUI-T1, QUI-T2, QUI-T3 and QUI-T4 are X, YX, YYX, YYYX, YYYYX, YYYYY.
      iv. In one example, a first flag is signaled to indicate whether BT is used. If BT is not used, then a second flag is signaled to indicate whether QUI-T is used. If QUI-T is used, which kind of QUI-T is used is further signaled. For example, the binarized codewords orderly to represent BT, TT, QUI-T1, QUI-T2, QUI-T3 and QUI-T4 are X, YX, YYXX, YYXY, YYYX, YYYY.
17. In one example, how to signal which kind of partitions is used in a block may depend on which kinds of partitions (including partition tree type and/or partition directions) are valid for the block. In following examples, X represents 0 or 1 and Y=~X (Y=1 if X=0 and Y=0 if X=1).
   a. In one example, the candidate BT, TT or QUI-Ts to be signaled are all vertical splits or horizontal splits depending on previously signaled or derived information.
   b. For example, the non-allowed or invalid split cannot be signaled from the encoder to the decoder, i.e. there is no codeword to represent the non-allowed or invalid split.
   c. In one example, if there is only one kind of split from BT, TT and QUI-Ts is valid, then the binarized code to indicate which kind of split (BT, TT, or a kind of QUI-T) is used is not signaled.
   d. In one example, if there are only two kinds of split from BT, TT and QUI-Ts are valid, then a flag is signaled to indicate which one of the two valid splits is used.
   e. In one example, the code to indicate which kind of split (BT, TT, or a kind of QUI-T) is binarized as a truncated unary code.
      i. For example, the maximum value of the truncated unary code is N−1, where N is the number of valid splits (BT, TT and QUI-Ts).
      ii. For example, no codeword represents an invalid split. In other words, the invalid split is skipped when building the codeword table.
   f. In one example, if no QUI-T is valid, the flag indicating whether QUI-T is used is not signaled and inferred to be false. For example, the binarized codewords orderly to represent BT and TT are X and Y.
   g. In one example, if only one kind of QUI-T is valid and QUI-T is signaled to be used, then no further information is signaled to indicate which QUI-T is used. The valid QUI-T is used implicitly.
   h. In one example, if only two kinds of QUI-T are valid and QUI-T is signaled to be used, then a flag is signaled to indicate which QUI-T is used.
   i. In one example, if only three kinds of QUI-T are valid and QUI-T is signaled to be used, then a message is signaled to indicate which QUI-T is used. For example, the binarized codewords orderly to represent the three QUI-Ts are X, YX, YY.
   j. In one example, the binarization and/or signaling method is not changed according to which kinds of split is valid in the block. An invalid split cannot be chosen in a conformance bit-stream.
18. Indications of partition may be coded by arithmetic coding with one or multiple contexts.
   a. In one example, only partial bins of a bin string may be coded with contexts and remaining bins may be coded with bypass mode (i.e., no context is utilized).
   b. Alternatively, all bins of a bin string may be coded with contexts.
   c. Alternatively, all bins of a bin string may be coded with bypass mode.

d. For a bin coded with context, one or multiple contexts may be used.
e. The context may depend on:
  i. The position or index of the bin.
  ii. The partitioning of spatial/temporal neighboring blocks.
  iii. The current partition depth (e.g., QT depth/BT depth/TT depth/QUI-T depth/MTT depth) of current block.
  iv. The partition depth (e.g., QT depth/BT depth/TT depth/QUI-T depth/MTT depth) of spatial/temporal neighboring blocks and/or spatial/temporal non-adjacent blocks.
  v. The coding modes of spatial/temporal neighboring blocks.
  vi. The width/height of spatial/temporal neighboring blocks.
  vii. The width/height of the current block
  viii. Slice types/picture types/tile group type
  ix. Color component
  x. Statistical results of partition types from previously coded blocks
19. Whether and/or how to use QUI-T may depend on color format (such as 4:4:4 or 4:2:0) and/or color components.
  a. Whether and how to use QUI-T may depend on whether luma and chroma coding trees are separated.
  b. In one example, QUI-T can only be applied on luma component when luma and chroma coding trees are separated.
20. The above methods may be also applicable to SnT, StT, OctT, UQT.

The examples described above may be incorporated in the context of the method described below, e.g., method 1300, which may be implemented at a video decoder/encoder.

Figure 13:
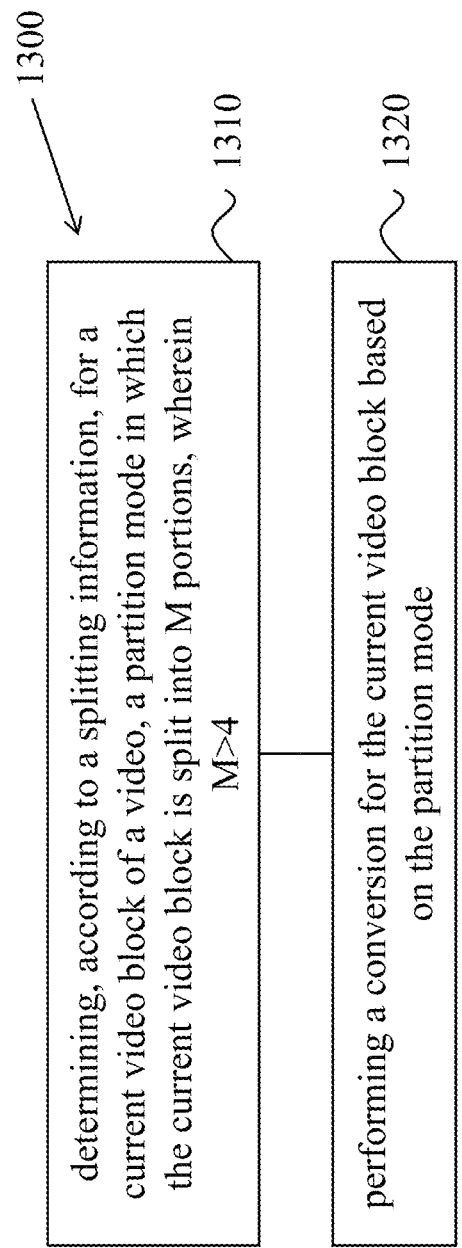
FIG. 13 shows a flowchart of an example method for video processing in accordance with the disclosed technology.

FIG. 13 illustrates a flowchart of an exemplary method for video processing. The method 1300 comprises, at step 1310, determining, according to a splitting information, for a current video block of a video, a partition mode in which the current video block is split into M portions, wherein M>4. In some embodiments, the current video block has a size W×H, and an i-th portion M, of the M portions has a size $W_i \times H_i$, W, H, $W_i$ and $H_i$ being integers, i=0 to M−1.

The method further comprises at step 1320, performing a conversion for the current video block.

Figure 14:
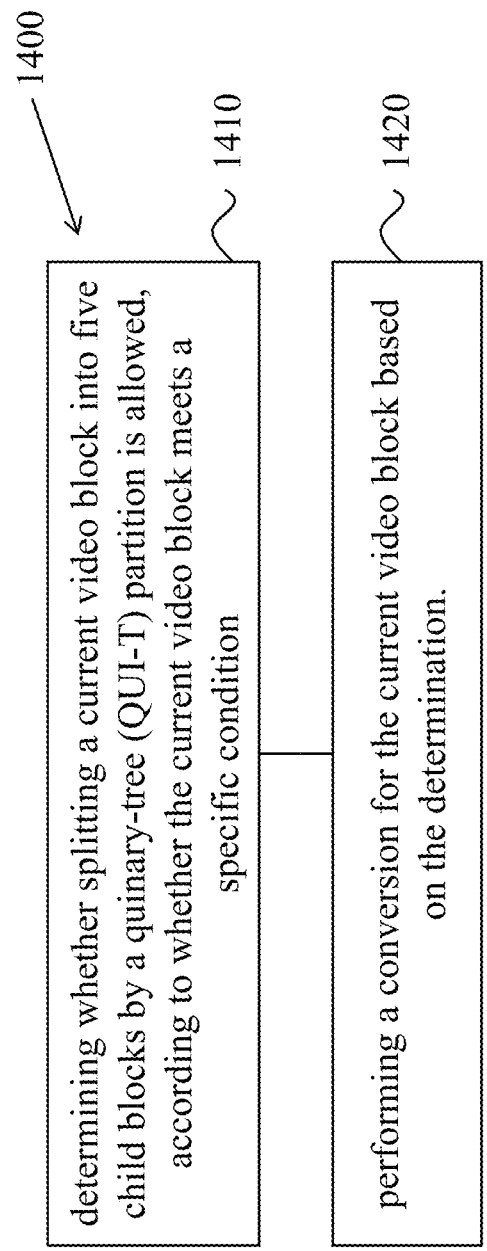
FIG. 14 shows a flowchart of another example method for video processing in accordance with the disclosed technology.

FIG. 14 illustrates a flowchart of an exemplary method for video processing. The method 1400 comprises: determining, at step 1410, whether splitting a current video block into five child blocks by a quinary-tree (QUI-T) partition is allowed, according to whether the current video block meets a specific condition; and at step 1420, performing a conversion for the current video block based on the determination.

Some embodiments and techniques related to methods 1300 and 1400 may be described using the following example.

In an example, there is disclosed a method for video processing, comprising: determining, according to a splitting information, for a current video block of a video, a partition mode in which the current video block is split into M portions, wherein M>4; and performing a conversion for the current video block based on the partition mode; wherein the current video block has a size W×H, and an i-th portion M, of the M portions has a size $W_i \times H_i$, W, H, $W_i$ and $H_i$ being integers, i=0 to M−1.

In an example, the current video block is split into five portions using Quinary-Tree(QUI-T) in the partition mode.

In an example, at least one of M portions can be further split into a plurality of sub-portions recursively.

In an example, at least one of M portions has at least one of a width and height with a value of power of 2.

In an example, the current video block is split in both horizontal and vertical directions.

In an example, at least one of M portions has a width less than the width of the current video block or has a height less than the height of the current video block.

In an example, the current video block is split in only one of horizontal and vertical directions.

In an example, each of M portions has a same height as the current video block if the current video block is split only in the vertical direction, and each of M portions has a same width as the current video block if the current video block is split only in the horizontal direction.

In an example, M portions are classified into two groups, and a first group comprises at least one portion, and a second group comprises remaining portions, wherein the at least one portion has a first size, and at least one of the remaining portions have a second size different from the first size.

In an example, the first group comprises only one portion with the first size, and each of the remaining portions has the second size.

In an example, the only one portion has a width of W/2, and each of the remaining portions has a width of (W/2)/(M−1); and the current video block is split in a vertical direction, and M portions are arranged from left to right in an order of the index i.

In an example, the only one portion has a height of H/2, and each of the remaining portions has a height of H/2)/(M−1); and the current video block is split in a horizontal direction, and M portions are arranged from top to bottom in an order of the index i.

In an example, M=5, and the current video block is split into five portions using Quinary-Tree(QUI-T); and the only one portion is $M_1$ or $M_3$.

In an example, M=5, and the current video block is split into five portions using Quinary-Tree(QUI-T); the only one portion has a width of W−((W/K)<<2), and each of the remaining portions has a width of W/K.

In an example, K is equal to one of 5, 8, 16, 32, 64.

In an example, the first group comprises two portions with the first size, and each of the remaining portions has the second size.

In an example, each of the two portions has a width of W/2*(M−1), and each of the remaining portions has a width of W/(M−1); and the current video block is split in a vertical direction, and M portions are arranged from left to right in an order of the index i.

In an example, each of the two portions has a height of H/2*(M−1), and each of the remaining portions has a height of H/(M−1); and the current video block is split in a horizontal direction, and M portions are arranged from top to bottom in an order of the index i.

In an example, M=5, and the current video block is split into five portions using Quinary-Tree(QUI-T); the two portions belong to one of sets as follows:
{$M_0$, $M_3$};
{$M_0$, $M_4$};
{$M_1$, $M_3$}; and
{$M_1$, $M_4$}.

In an example, the first group comprises two portions with the first size, and the remaining portions comprise at least one portion with a size different from the second size.

In an example, M=5, and the current video block is split into five portions using Quinary-Tree(QUI-T); each of the two portions has a width of W/16, and the remaining portions have widths of W/8, W/4 and W/2 respectively.

In an example, the current video block is split in a vertical direction, and M portions are arranged from left to right in an order of the index i; $W_0=W_4=W/16$, and $W_1=W/8$, $W_2=W/4$, and $W_3=W/2$.

In an example, M=5, and the current video block is split into five portions using Quinary-Tree(QUI-T); each of the two portions has a height of H/16, and the remaining portions have widths of H/8, H/4 and H/2 respectively.

In an example, M=5, and the current video block is split into five portions using Quinary-Tree(QUI-T); each of the two portions has the first size, and the remaining portions comprise two portions with the second size and one portion with a third seize different from the second size.

In an example, M is equal to one of 6, 7 and 8.

In an example, M=5, and the current video block is split into five portions using Quinary-Tree(QUI-T) in both vertical and horizontal directions, and
$W_0+W_1+W_2=W_3+W_4=W$;
$H_0=H_1=H_2$; $H_3=H_4$; and
$H_0+H_3=H$.

In an example, M=5, and the current video block is split into five portions using Quinary-Tree(QUI-T) in both vertical and horizontal directions, and
$W_1=W_2$;
$W_0+W_1=W_3+W_4=W$;
$H_0=H_1+H_2$;
$H_3=H_4$; and
$H_0+H_3=H$.

In an example, M=5, and the current video block is split into five portions using Quinary-Tree(QUI-T) in both vertical and horizontal directions, and
$W_0+W_1+W_2+W_4=W$;
$W_2=W_3$; and
$H_1$, $H_3=H_2+H_3=H_4=H$.

In an example, the current video block is split in a vertical direction, and M portions are arranged from left to right in an order of the index i; and
$W_0+W_1+W_2+\ldots+W_i\ldots+W_{M-1}=W$;
$H_0=H_1=H_2=\ldots=H_i\ldots=H_{M-1}=H$, wherein $0<=i<=M-1$.

In an example, M=5, and the current video block is split into five portions using Quinary-Tree(QUI-T); wherein
$W_0=W_4=W/8$, $W_1=W_2=W_3=W/4$; and
$H_0=H_1=H_2=H_3=H_4=H$.

In an example, the current video block is split in a horizontal direction, and M portions are arranged from top to bottom in an order of the index i; wherein
$H_0+H_1+H_2+\ldots+H_j\ldots+H_{M-1}=H$; and
$W_0=W_1=W_2=\ldots=W_3\ldots=W_{M-1}=W$, wherein $0<=j<=M-1$.

In an example, M=5, and the current video block is split into five portions using Quinary-Tree(QUI-T); wherein
$H_0=H_4=H/8$, $H_1=H_2=H_3=H/4$; and
$W_0=W_1=W_2=W_3=W_4=W$ In an example, M=6,
$W_4=\frac{1}{2}W$; $W_0=W_5=\frac{1}{16}W$; $W_1=W_2=W_3=\frac{1}{8}W$.

In an example, M=6, and the current video block is split in both vertical and horizontal directions, and
$W_0+W_1+W_2=W$;
$H_0=H_1=H_2$;
$W_0=W_3=W_4$;
$W_3+W_5=W$;
$H_0+H_3+H_4=H$; and
$H_1+H_5=H$.

In an example, a specific partition tree is not allowed to be applied to at least one of M portions if the current video block is split in a specific partition pattern, and the specific partition tree comprises at least one of vertical binary tree (BT), vertical ternary tree (TT), horizontal BT, horizontal TT, and quadtree (QT).

In an example, M=5, and the current video block is split into five portions in a vertical direction using Quinary-Tree (QUI-T), and $M_0$ to $M_4$ are arranged from left to right in an order of the index i; and wherein $M_0$ to $M_4$ have sizes of W/8×H, W/4×H, W/4×H, W/4×H and W/8×H respectively in the specific partition pattern.

In an example, M=5, and the current video block is split into five portions in a horizontal direction using Quinary-Tree(QUI-T), and $M_0$ to $M_4$ are arranged from top to bottom in an order of the index i; and wherein $M_0$ to $M_4$ have sizes of sizes of W×H/8, W×H/4, W×H/4, W×H/4, and W×H/8 respectively in the specific partition pattern.

In an example, each of M portions is indicated with an index and M portions are converted in an order of the index.

In an example, the partition mode comprises at least one partition pattern, and one or more conversion orders are pre-defined for the at least one partition pattern, and the method comprises: determining, for the at least one partition pattern, an indication indicating which conversion order is used to convert M portions.

In an example, said indication is signaled from an encoding side or derived at a decoding side.

In an example, the splitting information is present in a bitstream representation of the video including the current video block.

In an example, at least one of the portions of the current video block is at least one of a coding unit, a prediction unit and a transform unit.

In an example, there is disclosed a method for video processing, comprising: determining whether splitting a current video block into five child blocks by a quinary-tree (QUI-T) partition is allowed, according to whether the current video block meets a specific condition; and performing a conversion for the current video block based on the determination.

In an example, the specific condition comprises: the current video block being split from a parent block by at least one of quadtree (QT) partition, a binary tree (BT) partition, a ternary tree (TT) partition and a QUI-T partition.

In an example, the current video block is split from the parent block in the QT partition.

In an example, the specific condition comprises: the current video block being a root block.

In an example, the method further comprises: splitting at least one of five child blocks into a plurality of portions in at least one specific partition mode.

In an example, the at least one specific partition mode comprises at least one of BT and TT partitions.

In an example, the at least one specific partition mode comprises at least one of BT, TT and QUI-T partitions and excludes the QT partition.

In an example, the at least one specific partition mode comprises at least one of QUI-T and QT partitions and excludes BT and TT partitions.

In an example, the at least one specific partition mode excludes the QT partition.

In an example, none of five child blocks can be further split.

In an example, a split depth of at least one child block depends on a split depth of the current video block.

In an example, the split depth of at least one child block is equal to that of the current video block plus 1.

In an example, the split depth belongs to at least one of a QT split depth, a BT split depth, a TT split depth, a QUI-T split depth and a multiple-type tree (MTT) split depth.

In an example, different child blocks have different split depth increments in at least one of QUI-T, BT, TT, QT and MTT partitions.

In an example, at least one child block has a split depth increment which depends on a ratio of the at least one child block to the current video block in size.

In an example, at least one of the child blocks of the current video block is at least one of a coding unit, a prediction unit and a transform unit.

In an example, the conversion includes encoding the current video block into the bitstream representation of a video and decoding the current video block from the bitstream representation of the video.

In an example, there is disclosed an apparatus in a video system comprising a processor and a non-transitory memory with instructions thereon, wherein the instructions upon execution by the processor, cause the processor to implement the method in any one of examples described above.

In an example, there is disclosed a computer program product stored on a non-transitory computer readable media, the computer program product including program code for carrying out the method in any one of examples described above.

5. Example Implementations of the Disclosed Technology

Figure 12:
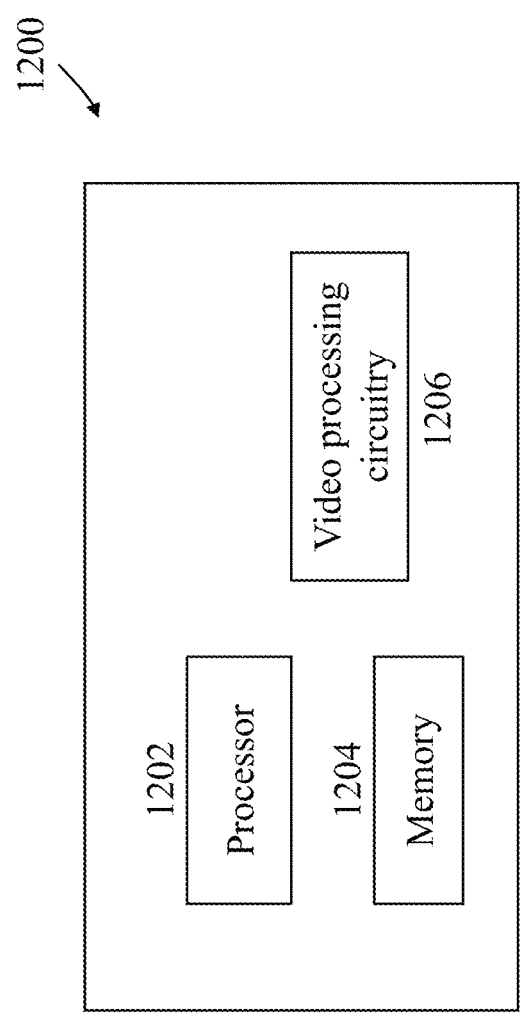
FIG. 12 is a block diagram illustrating an example of an apparatus that can implement a video encoder and/or decoder, which can be used to implement various portions of the presently disclosed technology.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1204 and video processing hardware 1206. The processor(s) 1202 may be configured to implement one or more methods (including, but not limited to, method 1200) described in the present document. The memory (memories) 1204 may be used for storing data and code used for implementing the methods and techniques described herein. The video processing hardware 1206 may be used to implement, in hardware circuitry, some techniques described in the present document.

In some embodiments, the video coding methods may be implemented using an apparatus that is implemented on a hardware platform as described with respect to FIG. 12.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, wherein the method is performed by a video processing apparatus, and the method comprises:
   determining, for a current video block of a video, a partition mode in which the current video block is split into M portions; and
   performing a conversion between the current video block and a bitstream based on the partition mode;
   wherein the current video block, before being split into the M portions, is split from a parent block by one or more kinds of split methods, and the current video block has a size W×H, and an i-th portion $M_i$ of the M portions has a size $W_i \times H_i$, W, H, $W_i$ and $H_i$ being integers, an index i=0 to M−1,
   wherein a specific partition tree is not allowed to be applied to at least one of the M portions in a case where the current video block is split in a specific partition pattern, and the specific partition tree comprises at least one of vertical binary tree (BT), vertical ternary tree (TT), horizontal BT, horizontal TT, and quadtree (QT), and
   wherein M is equal to 5, and the current video block is split into five portions in both vertical and horizontal directions using Quinary-Tree (QUI-T):
   $W_0+W_1+W_2=W_3+W_4=W$,
   $H_0=H_1=H_2$, $H_3=H_4$,
   $H_0+H_3=H$; or
   $W_1=W_2$,
   $W_0+W_1=W_3+W_4=W$,
   $H_0=H_1+H_2$,
   $H_3=H_4$,
   $H_0+H_3=H$; or
   $W_0+W_1+W_2+W_4=W$,
   $W_2=W_3$,
   $H_0=H_1=H_2+H_3=H_4=H$.

2. The method of claim 1, wherein at least one of the M portions is capable of being further split into a plurality of sub-portions recursively, and wherein at least one of the M portions has at least one of a width and height with a value of power of 2.

3. The method of claim 1, wherein the M portions are classified into two groups, and a first group comprises at least one portion, and a second group comprises remaining portions, wherein the at least one portion has a first size, and at least one of the remaining portions have a second size different from the first size,
   wherein the first group comprises only one portion with the first size, and each of the remaining portions has the second size; or
   the first group comprises two portions with the first size, and each of the remaining portions has the second size; or
   the first group comprises two portions with the first size, and the remaining portions comprise at least one portion with a size different from the second size.

4. The method of claim 3, wherein in a case where the first group comprises only one portion with the first size, and each of the remaining portions has the second size, the only one portion has a width of W/2, and each of the remaining portions has a same width; and the current video block is split in a vertical direction, and the five portions are arranged from left to right in an order of the index i; or
   the only one portion has a height of H/2, and each of the remaining portions has a same height; and the current video block is split in a horizontal direction, and the five portions are arranged from top to bottom in an order of the index i; and the only one portion is $M_1$ or $M_3$.

5. The method of claim 1,
   wherein each of the M portions is indicated with the index and the M portions are converted in an order of the index;
   wherein the partition mode comprises at least one partition pattern, and one or more conversion orders are pre-defined for the at least one partition pattern, and the method comprises:
   determining, for the at least one partition pattern, an indication indicating which conversion order is used to convert the M portions, wherein said indication is signaled from an encoding side or derived at a decoding side.

6. The method of claim 1, wherein the determining is based on whether the current video block meets a specific condition.

7. The method of claim 6, wherein the specific condition comprises:
   the current video block being split from the parent block by at least one of quadtree (QT) partition, a binary tree (BT) partition, a ternary tree (TT) partition and a QUI-T partition; or
   the specific condition comprises: the current video block being a root block,
   wherein the method further comprises splitting at least one of five child blocks into a plurality of portions in at least one specific partition mode the at least one specific partition mode comprises at least one of BT and TT partitions; or the at least one specific partition mode comprises at least one of BT, TT and QUI-T partitions and excludes the QT partition; or the at least one specific partition mode comprises at least one of QUI-T and QT partitions and excludes the BT and TT partitions;
   wherein a split depth of at least one child block depends on a split depth of the current video block, the split depth of at least one child block is equal to that of the current video block plus 1, and the split depth belongs to at least one of a QT split depth, a BT split depth, a TT split depth, a QUI-T split depth and a multiple-type tree (MTT) split depth;

wherein different child blocks have different split depth increments in at least one of QUI-T, BT, TT, QT and MTT partitions, at least one child block has a split depth increment which depends on a ratio of the at least one child block to the current video block in size;

wherein at least one of the child blocks of the current video block is at least one of a coding unit, a prediction unit and a transform unit.

8. The method of claim 1, wherein the conversion includes encoding the current video block into a bitstream.

9. The method of claim 1, wherein the conversion includes decoding the current video block from a bitstream.

10. An apparatus for processing video data comprising a processor and a non-transitory memory with instructions thereon, wherein the instructions upon execution by the processor, cause the processor to:

determine, for a current video block of a video, a partition mode in which the current video block is split into M portions; and perform a conversion between the current video block and a bitstream based on the partition mode;

wherein the current video block, before being split into the M portions, is split from a parent block by one or more kinds of split methods, and the current video block has a size W×H, and an i-th portion $M_i$ of the M portions has a size $W_i \times H_i$, W, H, $W_i$ and $H_i$ being integers, an index i=0 to M−1, wherein a specific partition tree is not allowed to be applied to at least one of the M portions in a case where the current video block is split in a specific partition pattern, and the specific partition tree comprises at least one of vertical binary tree (BT), vertical ternary tree (TT), horizontal BT, horizontal TT, and quadtree (QT), and wherein M is equal to 5, and the current video block is split into five portions in both vertical and horizontal directions using Quinary-Tree (QUI-T):

$W_0+W_1+W_2=W_3+W_4=W$,
$H_0=H_1=H_2$; $H_3=H_4$,
$H_0+H_3=H$; or
$W_1=W_2$,
$W_0+W_1=W_3+W_4=W$,
$H_0=H_1+H_2$,
$H_3=H_4$,
$H_0+H_3=H$; or
$W_0+W_1+W_2+W_4=W$,
$W_2=W_3$,
$H_0=H_1=H_2+H_3=H_4=H$.

11. A non-transitory computer-readable recording medium storing a bitstream of a video which is generated by a method performed by a video processing apparatus, wherein the method comprises:

determine, for a current video block of the video, a partition mode in which the current video block is split into M portions; and generating the bitstream for the current video block based on the partition mode;

wherein the current video block, before being split into the M portions, is split from a parent block by one or more kinds of split methods, and the current video block has a size W×H, and an i-th portion $M_i$ of the M portions has a size $W_i \times H_i$, W, H, $W_i$ and $H_i$ being integers, an index i=0 to M−1, wherein a specific partition tree is not allowed to be applied to at least one of the M portions in a case where the current video block is split in a specific partition pattern, and the specific partition tree comprises at least one of vertical binary tree (BT), vertical ternary tree (TT), horizontal BT, horizontal TT, and quadtree (QT), and wherein where M is equal to 5, and the current video block is split into five portions in both vertical and horizontal directions using Quinary-Tree (QUI-T) the QUI T:

$W_0+W_1+W_2=W_3+W_4=W$,
$H_0=H_1=H_2$; $H_3=H_4$,
$H_0+H_3=H$; or
$W_1=W_2$,
$W_0+W_1=W_3+W_4=W$,
$H_0=H_1+H_2$,
$H_3=H_4$,
$H_0+H_3=H$; or
$W_0+W_1+W_2+W_4=W$,
$W_2=W_3$,
$H_0=H_1=H_2+H_3=H_4=H$.

12. The apparatus of claim 10, wherein each of the M portions is indicated with the index and the M portions are converted in an order of the index;

wherein the partition mode comprises at least one partition pattern, and one or more conversion orders are pre-defined for the at least one partition pattern, and the processor is configured to:

determine, for the at least one partition pattern, an indication indicating which conversion order is used to convert the M portions, wherein said indication is signaled from an encoding side or derived at a decoding side.

13. The apparatus of claim 10, wherein at least one of the M portions has at least one of a width and height with a value of power of 2.

14. The non-transitory computer-readable recording medium of claim 11, wherein the partition mode comprises at least one partition pattern, and one or more conversion orders are pre-defined for the at least one partition pattern, and the method comprises:

determining, for the at least one partition pattern, an indication indicating which conversion order is used to convert the M portions, wherein said indication is signaled from an encoding side or derived at a decoding side.

15. The method of claim 6, wherein the specific condition comprises: the current video block being a root block and none of child blocks split from the current video block has a capability of being further split.

16. The method of claim 1, wherein in the case where M is equal to 5, and the current video block is split into five portions using Quinary-Tree (QUI-T) in the partition mode:

in a case that the current video block is split only in a vertical direction, each of the five portions has a same height as a height of the current video block; and in a case that the current video block is split only in a horizontal direction, each of the five portions has a same width as a width of the current video block.

* * * * *